(12) United States Patent
Kolych et al.

(10) Patent No.: US 12,389,198 B2
(45) Date of Patent: Aug. 12, 2025

(54) TRACKING OF OBJECTS USING RECONSTRUCTION OF DATA CARRIED BY WIRELESS SENSING SIGNALS FROM LIMITED SENSING FREQUENCIES

(71) Applicant: Cypress Semiconductor Corporation, San Jose, CA (US)

(72) Inventors: Igor Kolych, Lviv (UA); Igor Kravets, Lviv (UA); Oleg Kapshii, Lviv (UA); Kiran Uln, Pleasanton, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 419 days.

(21) Appl. No.: 17/733,911

(22) Filed: Apr. 29, 2022

(65) Prior Publication Data

US 2023/0353979 A1    Nov. 2, 2023

(51) Int. Cl.
*H04W 4/02* (2018.01)
*H04L 25/02* (2006.01)
*H04W 4/38* (2018.01)

(52) U.S. Cl.
CPC ......... *H04W 4/026* (2013.01); *H04L 25/0232* (2013.01); *H04W 4/027* (2013.01); *H04W 4/38* (2018.02)

(58) Field of Classification Search
CPC ....... H04W 4/026; H04W 4/38; H04W 4/027; H04L 25/0232
USPC ......................................................... 342/350
See application file for complete search history.

(56) References Cited

U.S. PATENT DOCUMENTS

| | | | |
|---|---|---|---|
| 10,924,308 B1* | 2/2021 | Crawford | H04B 1/16 |
| 2013/0297195 A1* | 11/2013 | Das | G08G 1/163 |
| | | | 701/117 |
| 2017/0158169 A1* | 6/2017 | Luo | G07C 9/21 |
| 2020/0119463 A1* | 4/2020 | Stitt | B60R 25/2072 |
| 2020/0307518 A1* | 10/2020 | Zhu | B60R 25/245 |
| 2021/0166509 A1* | 6/2021 | Stitt | H01Q 25/04 |
| 2021/0204136 A1* | 7/2021 | Lummer | H04W 4/023 |
| 2022/0026531 A1* | 1/2022 | Wu | G01S 13/88 |
| 2022/0057502 A1* | 2/2022 | Oishi | G01S 13/765 |

* cited by examiner

*Primary Examiner* — William Kelleher
*Assistant Examiner* — Samarina Makhdoom
(74) *Attorney, Agent, or Firm* — Lowenstein Sandler LLP

(57) ABSTRACT

Implementations disclosed describe techniques and systems for efficient determination and tracking of trajectories of objects in an environment of a wireless device. The disclosed techniques include, among other things, obtaining multiple sets of sensing values that characterize one or more radio signals received, during a respective sensing event, from an object in an environment of the wireless device. The sensing signals may be carried by waves with randomly selected frequencies representing a portion of all frequencies that are used as working sensing frequencies. Multiple techniques of efficient frequency interpolation and temporal interpolation are disclosed that reconstruct the sensing values to the full range of working frequencies. The reconstructed sensing values may then be used to track objects in the environment.

20 Claims, 12 Drawing Sheets

TRACKING OF OBJECTS USING RECONSTRUCTION OF DATA CARRIED BY WIRELESS SENSING SIGNALS FROM LIMITED SENSING FREQUENCIES

TECHNICAL FIELD

The present disclosure pertains to wireless networks. More specifically, the present disclosure pertains to tracking position and velocity of wireless devices by detecting sensing signals that carry information about distances to such devices. The present disclosure further pertains to techniques and systems capable of tracking wireless devices using a reconstructed set of sensing signals that is based on a limited number of sensing frequencies.

BACKGROUND

Personal area networks (PAN), such as Bluetooth (BT), Bluetooth Low Energy (BLE), and wireless local area networks (WLAN), such as Wi-Fi networks and other networks operating under the IEEE 802.11 or other wireless standards, provide wireless connection for various personal industrial, scientific, and medical applications. Many BT, BLE, and IEEE 802.11 applications use identification and secure communications that are predicated on correct localization of various objects that carry a wireless device. For example, automotive applications deploy passive keyless entry systems that localizes a key fob and locks/unlocks/starts the car based on the proximity of the key fob to the car. Similarly, a tire pressure monitoring system identifies a specific tire whose pressure falls below a certain reading. BLE specification defines a variety of techniques for performing object localization, such as by estimating signal strength of received wireless signals (e.g., received signal strength indication, RSSI), angle (direction) of arrival (AoA) of wireless signals, high-accuracy distance measurements (HADM) using time-of-flight (ToF) channel sensing, phase-based ranging (PBR), and other techniques. AoA uses multiple sensors (antennas) that exploit differences in phases of one or more unmodulated tones arriving at the sensors (positioned at different points in space) to estimate the directions of the wave propagation. Similarly, channel sensing (e.g., HADM) estimates a distance to an object (e.g., another BLE device) by measuring phase delays accumulated by a plurality of signals of different frequencies along a path from an initiator wireless device to return wireless device and back.

DETAILED DESCRIPTION

Figure 1:
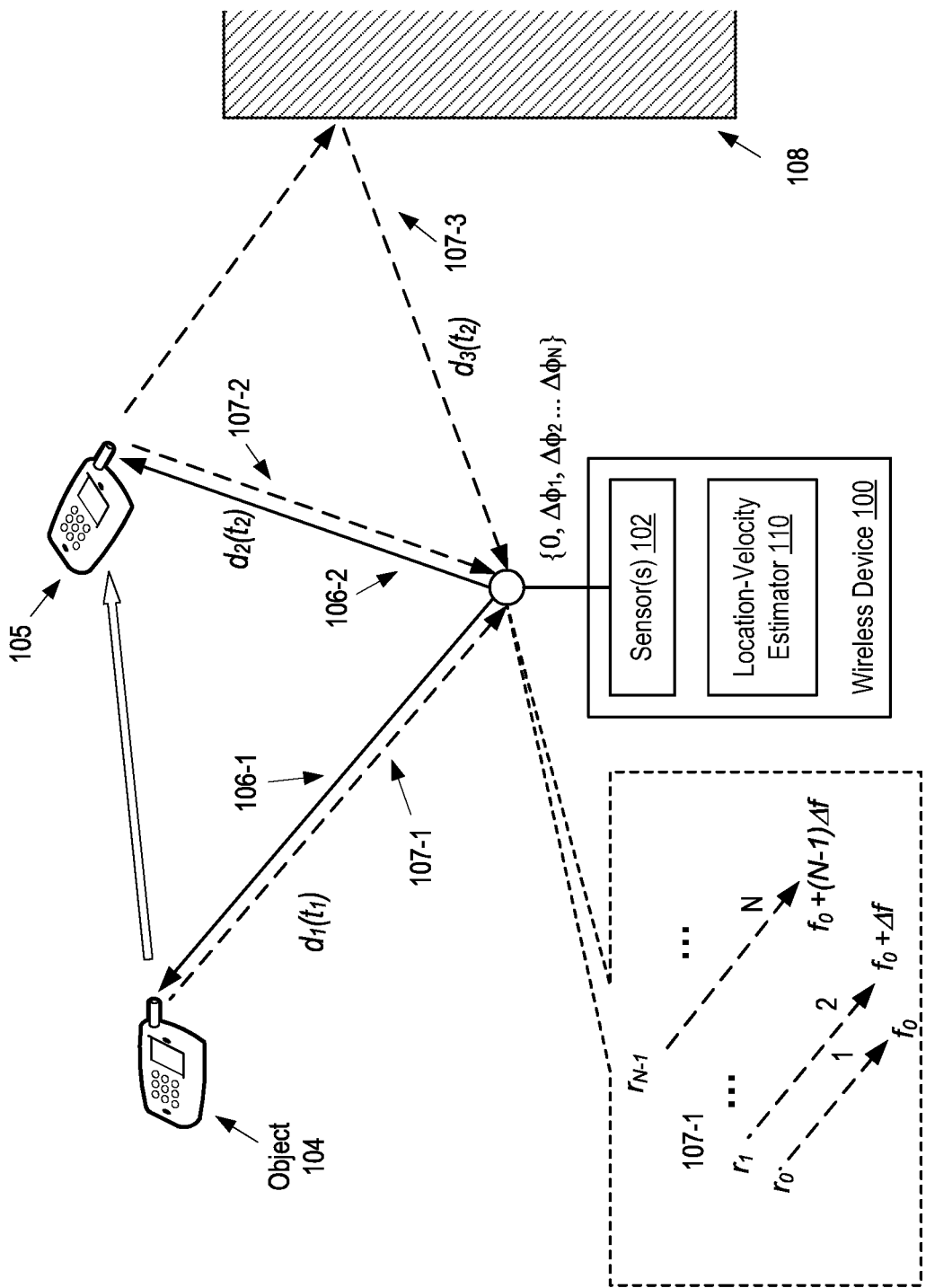
FIG. 1 illustrates one example setup for trajectory determination and tracking by a wireless device, in accordance with some implementations.

In various applications, wireless devices and various moving (or movable) objects that carry wireless devices, e.g., people, vehicles, cell phones, key fobs, items stored in a warehouse, etc., may be tracked using wireless (e.g., radio) signals. A distance to an object may be measured (e.g., using PBR techniques) for a series of times $t_i$ and the object's trajectory may be determined based on the measured distances $d(t_i)$. A distance to the object may be determined from the phase acquired by a sensing signal of some frequency $f_j$ upon propagation of the signal to the object and back, e.g., $\Delta\phi_j = 4\pi f_j d/c$. Optimal (accurate) distance estimation can utilize uniformly spaced sensing frequencies, $f_j = f_0 + (j-1)\Delta f$, with $j = 1, 2 \ldots$ and frequency spacing $\Delta f$. However, the use of uniformly spaced sensing frequencies can make wireless networks and devices vulnerable to outside (e.g., spoofing) attacks and can also be inconsistent with governmental regulations. On the other hand, selecting sensing frequencies randomly (or pseudo-randomly) can make application of various available distance tracking algorithms difficult and/or less accurate.

Aspects and implementations of the present disclosure address these and other limitations of the existing technology by enabling systems and methods of efficient tracking of moving objects using randomized sensing frequencies. In some implementations, during any given sensing event that occurs at time $t_i$, a number l of sensing frequencies $f_j$ may be selected, which may be a fraction of all m frequencies (working frequencies) being used. A sensing signal may then be prepared and transmitted with each selected frequency and returned by a device whose motion is being tracked. The phase and amplitude of the returned signals $r(f_j, t_i)$, associated with frequency $f_j$ and sensing time (event) $t_i$, may then be considered as a sensing signal data point (cell) within the frequency-time space (grid) of sensing signals. This frequency-time space may be partially filled with a fraction $l/m$ of all sensing cells known from measurements and the remaining fraction $1 - l/m$ of cells lacking measured data points (sensing values) $r(f_j, t_i)$. Various techniques disclosed herein enable interpolating the sensing values $r(f_j, t_i)$ from the randomized subset of known (measured) data points to the full set of data points for all used frequencies $\{f_j\}$.

In some implementations, a frequency interpolation may be used, e.g., interpolation within the same temporal slice (fixed $t_i$ but different $f_j$). In some implementations, a temporal interpolation may be used, e.g., interpolation within the same frequency slice (fixed $f_j$ but different $t_i$). In some implementations, both frequency interpolation and temporal interpolation may be used together. In some implementations, frequency and/or temporal interpolation may be performed based on the sensing values, $r(f_j, t_i)$ directly. In some implementations, frequency and/or temporal interpolation may be performed based on sensing values that undergo a certain transformation (folding) that allows identifying contributions into sensing signals from strong paths of wave propagation and performing interpolation that is aware of these strong paths.

In some implementations, during temporal interpolation, the missing data points may be padded with zero values (or otherwise interpolated), $r(f_j, t_i)=0$, transformed into a spectral representation (with respect to the time variable $t_i$), $r(f_j, t_i) \rightarrow r(f_j, \Omega)$, and filtered using a low-pass filter that removes the part of the spectral representation $r(f_j, \Omega)$ with the Fourier components that are faster than a certain predetermined threshold, $\Omega > \Omega_T$. The inverse Fourier transform, illustrated schematically with the Heaviside function, $r(f_j, \Omega)\Theta(\Omega_T - \Omega) \rightarrow R(f_j, t_i)$, may then recover reconstructed (interpolated) set of sensing values $R(f_j, t_i)$ for the entire range of sensing times and frequencies.

In some implementations, the sensing frequencies may be selected for each sensing event using a dynamic probability $P(t_{last})$, which depends on the last time $t_{last}$ a particular frequency was selected into a set of sensing signals and increases with increasing $t_{last}$, e.g., so that each of the sensing frequencies is used at least once during a predetermined time interval $\tau_{max}$. This facilitates elimination of aliasing (ghost objects). More specifically, when a sensing signal of a given frequency $f_j$ is repeated every $\tau$ seconds to detect an object moving with velocity v, consecutive sensing signals acquire the phases that differ by $\Delta\phi = 4\pi v\tau/c$. This means that the maximum velocity that can be resolved by this sequence of sensing signals (determined from the condition $\Delta\phi = 2\pi$) is $$v_{max} = \frac{c}{2f_j\tau},$$

as objects having velocity in the interval $[-v_{max}, v_{max}]$ can appear similar to objects (velocity aliasing) having velocity in the intervals $[v_{max}, 3v_{max}]$, $[3v_{max}, 5v_{max}]$, $[-3v_{max}, v_{max}]$, $[-5v_{max}, -3v_{max}]$, etc. Accordingly, forcing each frequency $f_j$ to be selected at least once every time interval $\tau_{max}$ allows to eliminate velocity aliasing if it is known that the speed of the device that is being tracked does not exceed $c/(2f_j\tau_{max})$. Additionally, the described techniques eliminate or reduce distance aliasing. Specifically, phases acquired by signals of frequency $f_j = f_0 + (j-1)\Delta f$ over the distance 2d of travel to and from an object are $\Delta\phi_j = 4\pi f_0 d/c + 4\pi(j-1)\Delta f d/c$. These phases have periodicity with respect to distance d with the period (when the phases differ by $2\pi$)

$$d_{max} = \frac{c}{2\Delta f},$$

which is also the maximum distance that can be resolved by the sensing signals with frequency spacing $\Delta f$, meaning that an object located within the interval $[0, d_{max}]$ can appear similar to an object located within the intervals of distances $[d_{max}, 2d_{max}]$, $[2d_{max}, 3d_{max}]$, etc.

The described techniques allow reconstruction of an expanded set of sensing values $\{R(f_j, t_i)\}$ using a limited set of measured sensing values $\{r(f_j, t_i)\}$ for pseudorandom frequencies $\{f_j\}$ selected as part of multiple sensing events $t_i$. As described in more detail below, the reconstructed (expanded) set of sensing values may be used to compute a likelihood tensor $P(d_0, v)$ that determines the likelihood (probability) that the return object's motion is described by a trajectory $d = d_0 + vt$, characterized by parameters $d_0$ (reference distance at time $t=0$) and v (velocity).

In one example of BLE systems, during a sensing event, m waves of different frequencies (tones) $f_j$ ($j \in [1, m]$), from the BT bandwidth (i.e., from 2.402 GHz to 2.480 GHz) may be transmitted by a wireless device that performs trajectory tracking of another wireless device or an object that transports such a wireless device. In another example of IEEE 802.11 wireless systems, tones of a sample set may be subcarriers transmitted simultaneously in a long training field (LTF) of a packet. The transmitted signals may be reflected by a return device (the device whose trajectory is being estimated) along the same path. A sensor (e.g., antenna) may detect arrival of m returned signals and extract a phase information from these signals, the phase information being representative of the length of the traveled path. In some instances, m signals reflected by the object may follow multiple, e.g., n, paths, including a path that correspond to the line-of-sight propagation and paths that involve reflections from walls, ceilings, and/or other objects, including multiple reflections. Such paths may be identified, e.g., as multiple maxima of the likelihood tensor that may further allow distinguishing the line-of-sight propagation from multipath reflections, as described below.

The advantages of the disclosed implementations include computationally efficient trajectory tracking for fast real-time monitoring of the locations of various objects in wireless network environments, which may include multiple wireless devices and various additional objects.

FIG. 1 illustrates one example setup for trajectory determination and tracking by a wireless device, in accordance with some implementations. A wireless device 100 may be any BT device, BLE device, or any other type of a device capable of generating, transmitting, receiving, and processing electromagnetic sensing signals. In some implementations, the sensing signals may be radio signals in the frequency range of the IEEE 802.11 wireless standard (e.g. 2.4 GHz band, 5 GHz band, 60 GHz band), or any other radio communication band. In some implementations, sensing signals may be compatible with one or more IEEE 802.11 wireless standards. Wireless device 100 may include one or more sensors 102 capable of transmitting and receiving sensing signals. Sensors 102 may include or be communicatively coupled to one or more antennas, such as dipole antennas, loop antennas, multiple-input multiple-output (MIMO) antennas, antenna arrays, or any other type of devices capable of receiving and transmitting electromagnetic signals. Localization system may consist or one or several wireless devices 100. The environment of wireless device 100 may include one or more objects, e.g., object 104, or additional objects not explicitly depicted in FIG. 1. Object 104 may be a wireless device (or may carry or otherwise transport a wireless device) capable of communicating wirelessly with wireless device 100. Although the references below are made to trajectory tracking being performed by wireless device 100, it should be understood that similar techniques and implementations may be used for distance estimation and trajectory determination/tracking performed by object 104, e.g., with trajectory of wireless device 100 (and/or any additional) devices being determined.

Wireless device 100 may generate and transmit a plurality of sensing signals. In some implementations, the sensing signals may have different frequencies (tones). More specifically, wireless device 100 may generate a signal 106-1 that includes multiple (e.g., N) tones, e.g., $f_0$, $f_0+\Delta f_1$, $f_0+\Delta f_2$ ..., and may transmit the generated signal to object 104, which may be a responding device belonging to the same wireless network as the wireless device 100. The responding device may perform analysis of the received signal 106-1, evaluate phase information that is used in returned signal 107-1. Wireless device 100 may similarly perform evaluation of phase information of the returned signal 107-1 to estimate the distance between wireless device 100 and the responding device (object 104-1) based on the total phase change. Each tone of the transmitted signal 106-1 (and, correspondingly, of the returned signal 107-1) may carry its own phase information. In particular, the total phase change $\Delta\phi$ associated with the distance $d_1$ between wireless device 100 and object 104 traveled by signal 106-1 and the same distance $d_1$ traveled by returned signal 107-1 of frequency $f_j$ is $\Delta\phi_j=4\pi f_j d_1/c$, where c is the speed of light. This phase change is representative of the distance $d_1$ ($t_1$) to object 104 at time $t_1$. The callout portion of FIG. 1 illustrates schematically a composition of signal 107-1 (illustrated with dashed lines) that is returned from object 104.

At a later time $t_2$, object 104 may move to a different location 105. A new sensing signal 106-2 (e.g., similarly having N sensing tones $f_j$) may be transmitted by wireless device 100 and may cause a returned signal 107-2 carrying phase information representative of the new distance $d_2(t_2)$ to object 104. As depicted in FIG. 1, an additional returned signal 107-3 may reach sensor(s) 102 of wireless device 100 over a different path that includes reflection from another object, e.g., a wall 108. The distance $d_3(t_2)$ traveled by signal 107-3 may be larger than distance $d_2$ of the line-of-sight propagation. Although one returned signal path is indicated for time $t_1$ and two paths are indicated for time $t_2$, any number of returned signal paths may be present for any detection time (sensing event) $t_i$. Similarly, transmitted signal paths may also include multipath propagation (not depicted in FIG. 1). In some instances, the direct line-of-site path may be blocked by other objects, such that only paths with one or more reflections may be present. As object 104 is moving relative to other objects of the environment, the number of paths may change with time, e.g., may be different at different detection times (sensing events) $t_i$.

The phase changes $\Delta\phi_j$ carried by the returned sensing signals may be exploited using the multiple signal classification (MUSIC) algorithm, generalized cross-correlation (GCC) algorithm, inverse Fourier transform algorithm, or any other suitable processing algorithms that are further improved according to implementations of the present disclosure. The following operations may be performed for each of the sensing events $t_i$ to determine a respective likelihood vector $P_i(d)$, as described below. Likelihood vector $P_i(d)$ may be a vector (array) in a distance space with specific values of the likelihood vector indicating the likelihood (probability or be proportional to probability or has some relation to probability) of various distances to the wireless device that is being tracked. Multiple likelihood vectors $P_i(d)$ may then be combined into a likelihood tensors described in more detail below.

As illustrated in FIG. 1, a sensing event initiated (at each of the detection times $t_i$) by wireless device 100 may include transmitting and then detecting N returned signals (each with a different frequency $f_j$). Each of the detected sensing values $r_j$ may characterize a superposition of waves propagating along n paths; some (or all) of the paths may include one or more reflections:

$$r_j = \left(\sum_{k=1}^{n} a_j(d_k)S_k + n_j\right)\left(\sum_{l=1}^{n} a_j^*(d_l)S_l^* + n_j'\right) j \in [1, N],$$

where $S_k$ represents the amplitude of the wave traveled over k-th path, $n_j$ is the noise associated with forward propagation (and detection) of j-th frequency (tone, channel) $f_j$, $n'_j$ is the noise associated with backward propagation (and detection) of j-th frequency, and $a_j$(d) is a steering vector (also denoted, in vector notations, as $\hat{a}(d)$) that describes phase change over distance d, which may take one of the values $d=d_1 \ldots d_n$. In particular, for N equidistant sensing tones, $f_j=f_0+(j-1)\Delta f$, the steering vector may have the form, $a_j(d)=\exp[4\pi i(j-1)\Delta f d/c]$.

In MUSIC algorithm implementations, sensing values may be used to construct the N×N covariance matrix, $R_{ji}=\langle(r_j r_i^*)\rangle$, where the angular brackets $\langle \ldots \rangle$ denote statistical averaging and $r_i^*$ stands for complex conjugation of $r_i^*$. In some implementations, covariance matrix may be formed using square roots (with suitably chosen sign value) of sensing values, e.g., $R_{ji}=\langle\sqrt{r_j}\sqrt{r_i^*}\rangle$. In some implementations, statistical averaging may be performed using smoothing in the frequency domain, e.g., using smooth-MUSIC algorithm. In some implementations, statistical averaging may include averaging in the time domain, e.g., by collecting multiple instances of data. In some implementations, time averaging is not performed. For uncorrelated noise, $\langle n_j n_i^*\rangle=\delta_{ji}\sigma^2$, where $\sigma^2$ is the noise variance in a single sensing channel.

Covariance matrix $\hat{R}$ may have n signal eigenvectors $\hat{s}_{(1)} \ldots \hat{s}_{(n)}$ and N−n noise eigenvectors $\hat{g}_{(n+1)} \ldots \hat{g}_{(N)}$ (which define what is commonly referred to as the noise subspace), with subscript a enumerating various eigenvectors. For uncorrelated noise, noise eigenvectors are orthogonal to the steering vector: $\hat{a}^\dagger(d_m)\cdot\hat{g}_{(\alpha)}=0$. Accordingly, the localization vector P(d) (often referred to in MUSIC and GCC applications as the pseudo-spectrum), defined using noise eigenvectors as, $$P^{-1}(d) = \sum_{\alpha=n+1}^{N} |\hat{a}^\dagger(d)\cdot\hat{g}_{(\alpha)}|^2$$

has maxima for the actual distances $d=d_1 \ldots d_n$ of signal propagation, some of which may correspond to direct (line-of-sight) signal propagation and some may correspond to paths that include at least one reflection. In some implementations, the localization vector may be defined using signal eigenvectors, e.g., as $$P(d) = \sum_{\alpha=1}^{n} \lambda_{(\alpha)}|\hat{a}^\dagger(d)\cdot\hat{s}_{(\alpha)}|^2,$$

where $\lambda_{(\alpha)}$ is the eigenvalue corresponding to signal eigenvector $\hat{s}_{(\alpha)}$.

The above example of the MUSIC localization vector is intended to be illustrative. In various implementations, the localization vector P(d) may be obtained using different procedures. For example, in the GCC method, the localization vector may be defined as, $$P(d) = \left| \sum_{j=1}^{N} a_j^*(d) r_j \right|^2.$$

This vector may similarly have maxima for the actual distances $d=d_1 \ldots d_n$, and may be computed using Inverse Fast Fourier algorithm techniques. Numerous other ways of defining the localization vector P(d) are also within the scope of the present disclosure.

In some implementations, a likelihood vector P(d) may be transformed into a likelihood tensor $P(d_0, v)$. The transformation $P(d) \rightarrow P(d_0, v)$ may be performed in a variety of ways. This can be done because of replacement single independent variable by two dependent variables $d \rightarrow d_0, v$ in P(d). In some implementations, the likelihood vectors from multiple sensing events may be joined into the likelihood tensor as follows, $$P(d_0,v)=(d_0+vt_1)+P_2(d_0+vt_2).$$

In some implementations, different likelihood vectors may be weighted differently, e.g., $$P(d_0,v)=(d_0+vt_1)+W_2 P_2(d_0+vt_2),$$

with weights $W_1$ and $W_2$, which may be used for normalization of P(d) vector, so, total sum of P(d) is one, e.g., with likelihood vectors corresponding to closer ranges given higher weights. In these formulas, the likelihood vectors are identified with subscripts 1 and 2, to reference the sensing events whose measurements contribute data for the respective likelihood vectors, even though the function that is used to construct each likelihood vector may be the same, e.g., P(d). The likelihood tensor $P(d_0, v)$ is a quantity that is defined on the two-dimensional space of distance $d_0$ and velocity v. The actual values of $d_0$ and v for the object being tracked may be determined by an optimization procedure, e.g., by finding the maxima of $P(d_0, v)$, or, alternatively, the minima of $P^{-1}(d_0, v)$. Although two likelihood vectors are combined in this example, any number of likelihood vectors may be combined in a similar fashion.

The above process may continue with the additional sensing data for each new sensing event, $i=3, 4, \ldots$, being used to update the likelihood tensor using a new likelihood vector $P_i(d_0+vt_i)$:

$$P(d_0,v) \rightarrow P(d_0,v)+W_i \cdot P_i(d_0+vt_i),$$

In some implementations, the number of sensing events that are counted towards the likelihood tensor may be limited to a predetermined number M of sensing events, such that after M contributions into the likelihood tensor are collected, when each additional contribution is added, the earliest contribution is subtracted from the likelihood tensor (e.g., the i=1 contribution in this example):

$$P(d_0,v) \rightarrow P(d_0,v)+W_{M+1} \cdot P_{M+1}(d_0+vt_i)-W_1 \cdot P_1(d_0+vt_i).$$

The number M may be selected to include multiple sensing events but still be small enough so that the velocity of the object is unlikely to change substantially over the duration of the last M sensing events. For example, if one sensing event occurs every 0.1 sec, the maximum number of events included in the likelihood tensor may be M=10. As a result, the optimization of the likelihood tensor provides an accurate estimate of the average velocity (and reference distance) to the object over the sliding window of the last 0.5 sec, which under many practical conditions may be short enough for the constant velocity model to be sufficiently accurate.

In the implementation described above, the likelihood tensor for a combination of events is the harmonic mean of the likelihood vectors for each event, $P=P_1+P_2+\ldots$. In some implementations, the likelihood tensor for a combination of events may instead be the sum of likelihood vectors computed for each event, $=P_1+P_2+\ldots$, or any other suitable measure. In some implementations, e.g., where different sensing events have unequal number of sub-events, the likelihood vectors computed for individual events may be weighed with suitably chosen weights, e.g., weights proportional to the number of sub-events in each sensing event, weights that are empirically determined, and so on.

In the above examples, the location-velocity determination and tracking is illustrated using the two-dimensional (2D) likelihood tensor $P(d_0, v)$ in location-velocity space. Similar techniques may be used for trajectory determination and tracking in higher dimensions, where multiple coordinates of the object and multiple components of velocity are being determined. For example, in the more general case, the trajectory may be determined using a vector model, $\vec{r} = \vec{r}_0 + \vec{v} t$, with a vector reference location, $\vec{r}_0 = (x_0, y_0 \ldots)$ and a vector velocity $\vec{v} = (v_x, v_y \ldots)$, where $x, y \ldots$ are any suitable coordinates including Cartesian coordinates, polar coordinates, elliptical coordinates, spherical coordinates, cylindrical coordinates, and so on. A higher-dimensional (HD) likelihood tensor may be a tensor in 2m-dimensional space of m (e.g., m=2 or m=3) coordinates $x, y \ldots$ and m velocity components, $v_x, v_y \ldots$. More specifically, the likelihood tensor may be $$P(\vec{r}_0, \vec{v}) = \sum_{\text{Last } M \text{ events}} W_i P_i(|\vec{r}_0 + \vec{v} t_i|).$$

Figure 2:
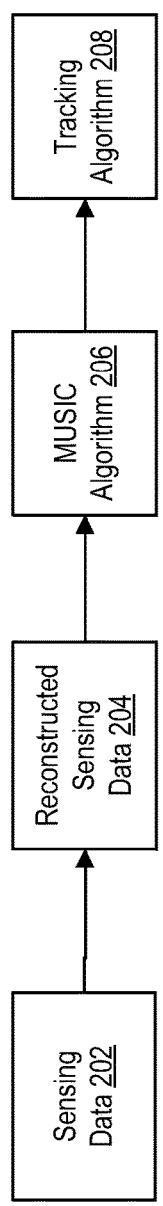
FIG. 2 illustrates example flow of operations during distance-based object tracking, in accordance with some implementations.

FIG. 2 illustrates example flow of operations 200 during distance-based object tracking using a single sensing station, in accordance with some implementations. As depicted in FIG. 2, a wireless device may collect sensing data (block 202) representative of the current distances $d(t_i)$ to the object being tracked. The sensing data may be obtained using a limited set of sensing frequencies. At block 204, the limited set of sensing data may be used to obtain an expanded (or reconstructed) set of sensing data for an expanded set of frequencies, as described in more detail below. The wireless device may then generate the 2D likelihood tensor (as described above). For example, the wireless device may obtain, at block 206, a set of likelihood vectors $P_i(d)$ using MUSIC algorithm, or any other algorithm that uses a uniform frequency step or a uniform time step. In some implementations, various other algorithms may be used, including but not limited to GCC, Inverse Fast Fourier Transform, or any other suitable algorithm. The wireless device may then use any suitable tracking algorithm 208 to track distance and/or velocity of the object. In one non-limiting example implementation, tracking algorithm 208 may include constructing the 2D likelihood tensor $P(d_0, v)$. The 2D likelihood tensor may be constructed according to any techniques described above, e.g., using the discretization and interpolation techniques. The 2D likelihood tensor $P(d_0, v)$ may be used to estimate the trajectory of the object, by finding one or more extrema of the respective likelihood tensor.

Figure 3A:
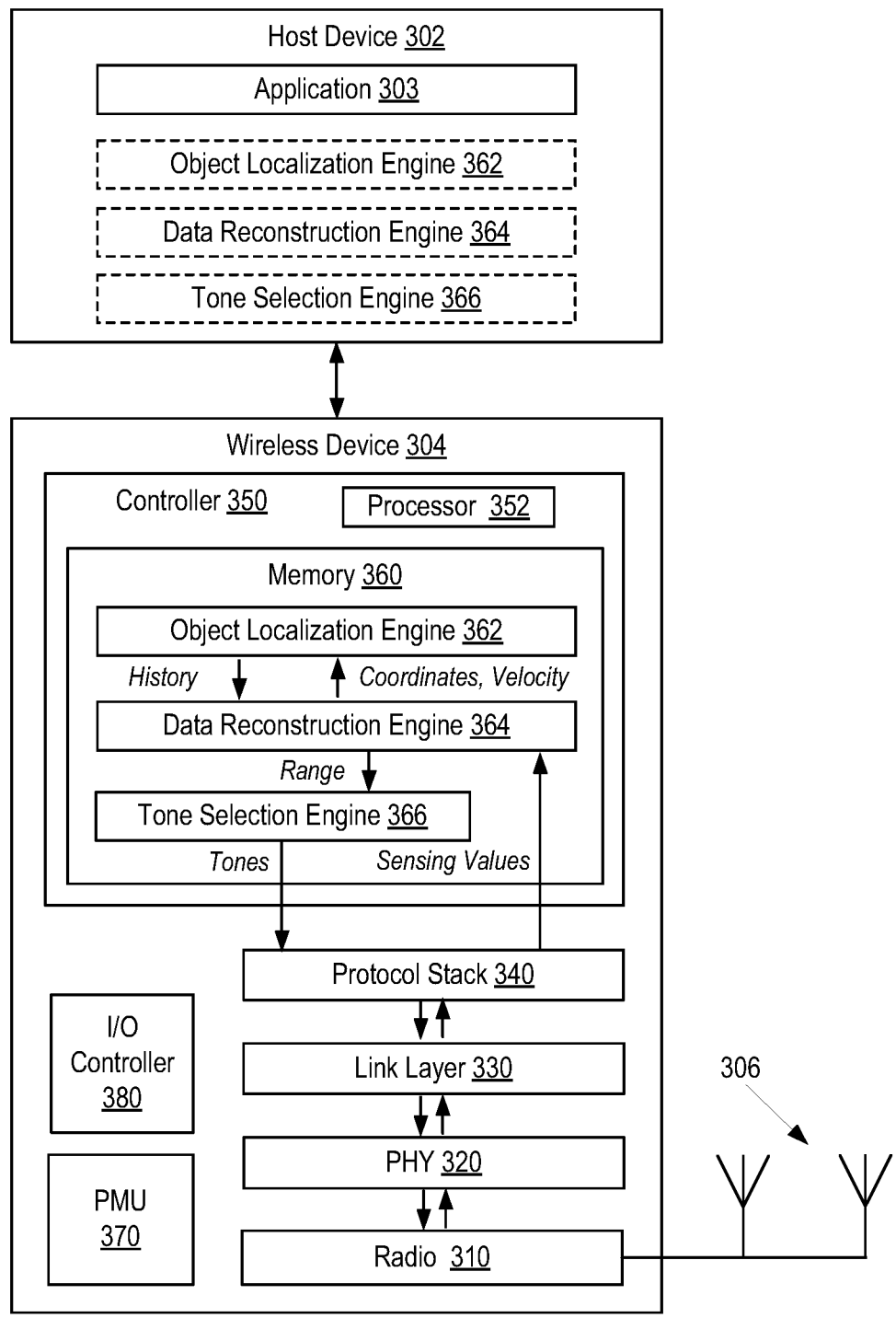
FIG. 3A illustrates one exemplary implementation of a wireless (BT or BLE) system capable of supporting efficient trajectory determination and tracking for fast and precise localization of objects, in accordance with some implementations.

FIG. 3A illustrates one exemplary implementation of a wireless (BT or BLE) system 300 capable of supporting efficient trajectory determination and tracking for fast and precise localization of objects, in accordance with some implementations. Wireless system 300 may be a BL network, a BLE network, a Wi-Fi, or any other type of a wireless network (e.g., PAN, WLAN, etc.). Wireless system 300 may include any number of host devices 302 (one host device is depicted for conciseness). A host device 302 may be any desktop computer, laptop computer, tablet, phone, smart TV, sensor, appliance, system controller (e.g., an air conditioning, heating, water heating controller), component of a security system, medical testing or monitoring equipment, automotive equipment, or any other type of a device. Host device 302 may be coupled (e.g., via a wired connection) to a respective wireless device 304. For brevity, shown is a single wireless device 304, but it should be understood that host device 302 may be coupled to any number of such wireless devices, e.g., a BLE wireless device and a Zigbee® wireless device. In some implementations, wireless device 304 may be implemented as an integrated circuit (IC) device (e.g., disposed on a single semiconductor die). In some implementations, various modules and components may be absent or shared between multiple wireless devices coupled to the host device (e.g., antenna(s) 306 and/or processor 352 may be shared between multiple wireless devices).

Wireless device 304 may use one or more antennas 306 to receive and transmit radio waves (e.g., sensing signals or radio frequency (RF) signals). A radio frequency (RF) signal received by antenna(s) 306 may be processed by radio 310 which may include filters (e.g., band-pass filters), low-noise radio-frequency amplifiers, down-conversion mixer(s), intermediate-frequency amplifiers, analog-to-digital converters, inverse Fourier transform modules, deparsing modules, interleavers, error correction modules, scramblers, and other (analog and/or digital) circuitry that may be used to process modulated signals received by antenna(s) 306. Radio 310 may further include a tone (frequency) generator to generate radio signals at selected tones. Radio 310 may also include antenna control circuits to control access to one or more antennas 306, including switching between antennas. Radio 310 may additionally include radio control circuits, such as phase measurement circuits and a tone selector circuit. The phase measurement circuits can perform phase measurements on received signals, e.g., IQ decomposition, which may include measuring a phase difference between the received signal and a local oscillator signal. The tone selector circuit can select tones for transmission.

Radio 310 may provide the received (and digitized) signals to a PHY 320 components. The received signals may carry information about radio wave propagation to and from one or more return devices (this information is referred to as sensing values or signal values herein). PHY 320 may support one or more operation modes, e.g., BLE operation modes. Although one PHY 320 is shown, any suitable number of PHY layers (supporting a respective number of operation modes) may be present. PHY 320 may convert the digitized signals received from radio 310 into frames that can be fed into a Link Layer 330. Link Layer 330 may have a number of states, such as advertising, scanning, initiating, connection, standby. Link Layer 330 may transform frames into data packets. During transmission, data processing may occur in the opposite direction, with Link Layer 330 transforming data packets into frames that are then transformed by PHY 320 into digital signals provided to radio 310. Radio 310 may convert digital signals into radio signals and transmit the radio signals using antenna(s) 306. In some implementations, radio 310, PHY 320, and Link Layer 330 may be implemented as parts of a single integrated circuit.

Wireless device 304 may include a protocol stack 340. The protocol stack 340 may include a number of protocols, e.g., Logical Link Control Adaptation Protocol (L2CAP), which may perform segmentation and reassembly of data packets that are generated by one or more applications 303 operating on host device 302. Specifically, L2CAP may segment data packets of arbitrary size, as output by the application(s) 303, into packets of the size and format that can be processed by Link Layer 330. L2CAP may also perform error detection operations. The protocol stack 340 may also include generic access profile (GAP) and generic attribute profile (GATT). GAP may specify how wireless device 304 advertises itself on the wireless network, discovers other network devices, and establishes wireless links with the discovered devices. GATT may specify how a data exchange between communicating wireless devices is to occur once the connection between the two devices is established. The protocol stack 340 may further include a security manager (SM) that controls how pairing, signing, and encryption of data is performed. GATT may use attribute protocol (ATT) that specifies how units of data are transferred between devices. Wireless device 304 may also include other components not explicitly shown in FIG. 3A, such as a host-controller interface.

Wireless device 304 may have a controller 350, which may include one or more processors 352, such as central processing units (CPUs), finite state machines (FSMs), field-programmable gate arrays (FPGAs), application-specific integrated circuits (ASIC), or the like. Processor(s) 352 may also include custom logic and/or programmable logic, or any combinations thereof. In some embodiments, controller 350 may be a single processing device that supports processes associated with data transmission and reception as well as distance (and/or angle) estimation computations. In some implementations, wireless device 304 may have a dedicated processor for distance (and/or angle) estimation computations that is separate from a processor that executes other operations on wireless device 304 (e.g., processes associated with data transmission and reception).

Wireless device 304 may also include a power management unit (PMU) 370, which manages clock/reset and power resources. Wireless device 304 may further include an input/output (I/O) controller 380 to enable communications with other external devices (including non-network devices) and structures. In some implementations, I/O controller 380 may enable a general purpose I/O (GPIO) interface, a USB interface, a serial digital interface (SDI), a PCM digital audio module, a universal asynchronous receiver transmitter (UART), I2C, I2S, or any other I/O components.

Controller 350 may include a memory 360, which may be (or include) a non-volatile, e.g., read-only (ROM) memory, and/or volatile, e.g., random-access (RAM), memory. Memory 360 may store codes and supporting data for an object localization engine 362, a data reconstruction engine 364, a tone selection engine 366, and other suitable engines. In some implementations, any one or more of the engines may be located on host device 302, as indicated with the respective dashed boxes in FIG. 3A. The engines may be operating in conjunction with a domain-specific application 303, which may be a device- or asset-tracking application, an indoor navigation application, an authentication application, or any other suitable application. Placement of the engines 362-366 on host device 302 or wireless device 304 may be based on domain-specific criteria as well as on power constraints. In those implementations, where low latency is of high priority, engines 362-366 may be placed on wireless device 304. In other implementations, where reduced power consumption is advantageous, engines 362-366 may be placed on host device 302. In some implementations, some engines (e.g., tone selection engine 366) may be placed on wireless device 304 while other engines (e.g., object localization engine 362 and data reconstruction engine 364) may be placed on host device 302.

Application 303 may use information about various objects located in the environment of the host device 302/wireless device 304 (which may, in some implementations, be mounted on a single platform or in proximity of each other). Such information may include distances to the objects, directions to the objects, orientations of the objects relative to host device 302/wireless device 304, or any other spatial characteristics data. The data may be provided by the object localization engine 362, which receives and processes sensing data reconstructed by data reconstruction engine 364, e.g., as described in more detail below. In some implementations, the object localization engine 362 provides an expected range of distances to the objects to the tone selection engine 366. The expected range of distances may be dependent on specific application 303 that is supported by operations of wireless device 304. For example, in key fob applications, the range of distances may be up to several meters, in warehouse product tracking applications, the range of distances may be tens of meters or even more. Based on the received range of distances, the tone selection engine 366 may select tones for a given sensing event, which may be tones separated by a uniform frequency increment, e.g. $f_0+(k-1)\times\Delta f$. The tone selection engine 366 may further specify the total number N of tones to be used, e.g., k=1 . . . N. In some implementations, the tone selection engine 366 may select tones that maximize the use of the available bandwidth (e.g., BT bandwidth), the tones that maximize the range of detected distances (e.g., closely spaced tones), the tones that maximize the accuracy of detected distances (e.g., widely spaced tones). In some implementations, the tone selection engine 366 may select tones randomly, or according to any predefined pattern.

Selected tones may be provided to protocol stack 340 (and link layer 330 and PHY 320) that may cause radio 310 to generate signals at the selected tones and transmit the generated signals to the outside environment. Radio 310 may then receive the reflected (returned) signals from various objects (other wireless devices) of the environment and determine phase shifts experienced by the reflected signals, e.g., by comparing the phase information carried by the reflected signals with phase information of the local oscillator copies of the transmitted signals. Radio 310 may further determine amplitudes of the reflected signals. The amplitude and phase information may be provided to the data reconstruction engine 364 (e.g., in the form of sensing values), which computes the covariance matrix. The data reconstruction engine 364 may include the location-velocity estimator 110 (depicted in FIG. 1). The object localization engine 362 may estimate trajectories and perform tracking of the objects, authentication of the objects, maintaining communications with the objects and so on.

Figure 3B:
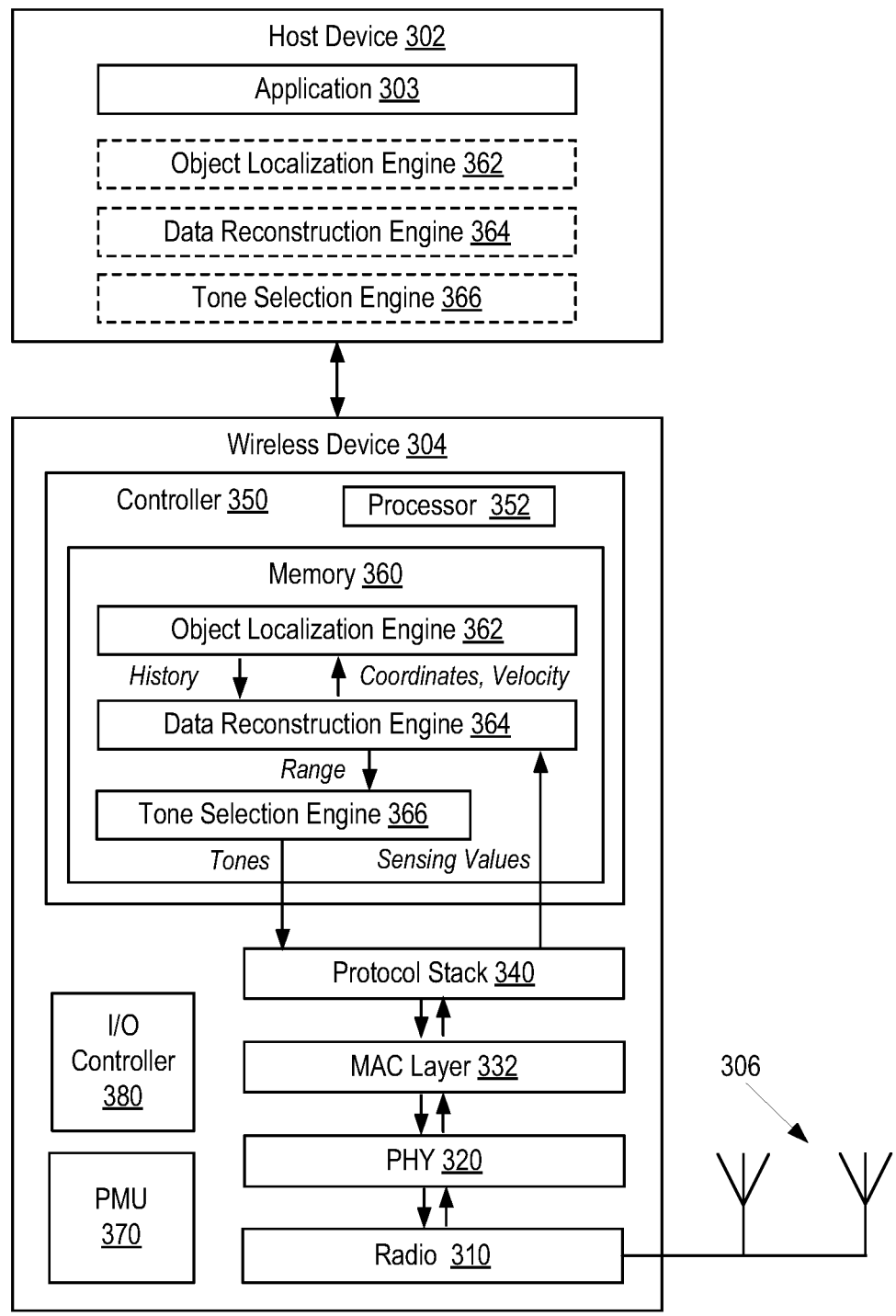
FIG. 3B illustrates one exemplary implementation of a wireless (WLAN) system capable of supporting efficient trajectory determination and tracking for fast and precise localization of objects, in accordance with some implementations.

FIG. 3B illustrates one exemplary implementation of a wireless (WLAN) system 301 capable of supporting efficient trajectory determination and tracking for fast and precise localization of objects, in accordance with some implementations. Although the wireless system 300 has been described above in conjunction with BT/BLE implementations, similar systems may be used in conjunction with any WLAN (e.g., Wi-Fi) implementations. In a WLAN wireless system 301, an appropriate wireless media access control (MAC) layer 332 may be used instead of the Link Layer 330 in addition to a WLAN-specific PHY layer 320 and a protocol stack 340. In Wi-Fi, and other WLAN systems, sensing tones may be transmitted in a single packet.

Figure 4:
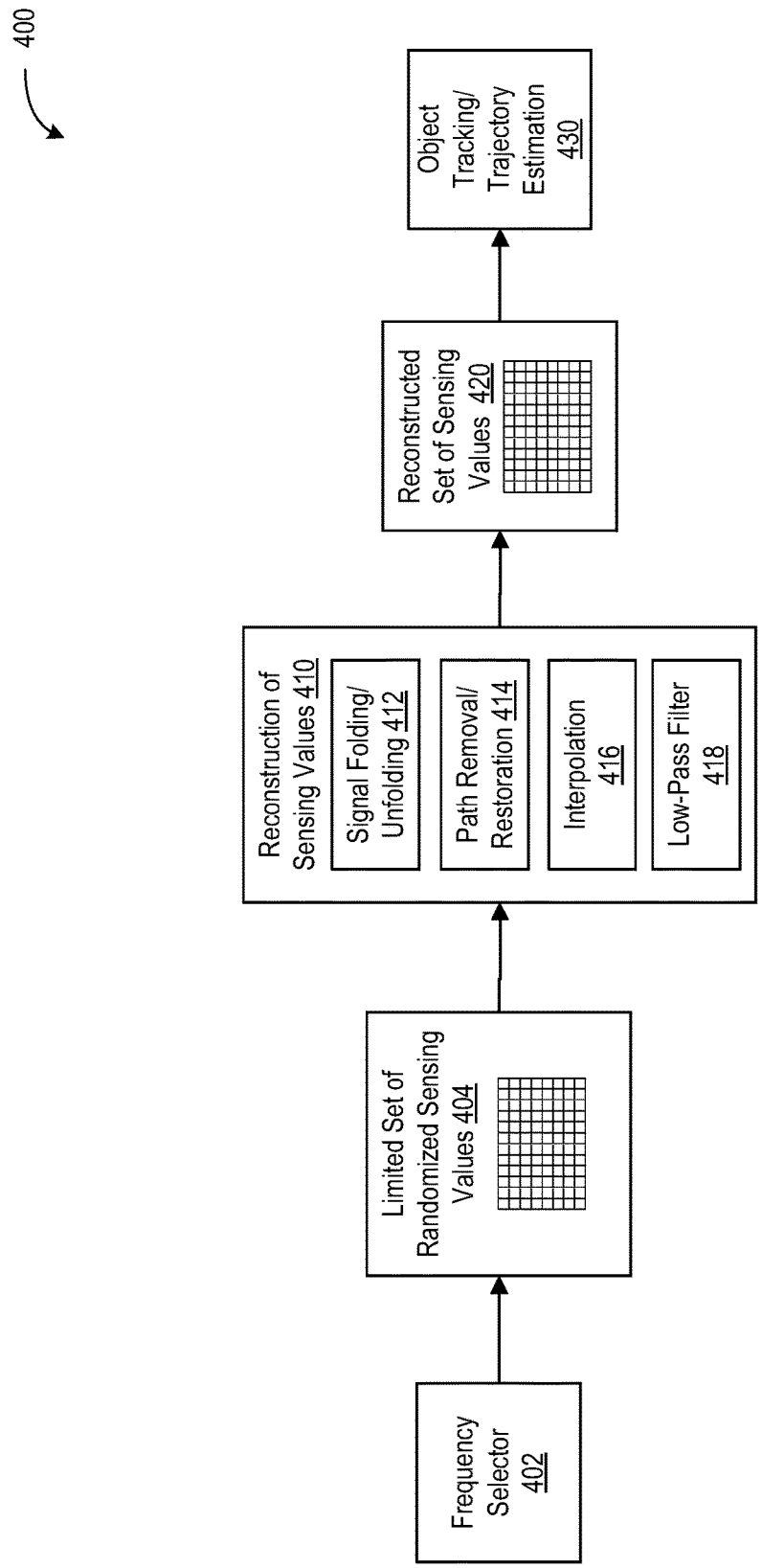
FIG. 4 illustrates an example flow of operations of reconstruction of sensing values performed in the frequency and/or temporal domain, in accordance with some implementations.

FIG. 4 illustrates an example flow of operations 400 of reconstruction of sensing values performed in the frequency and/or temporal domain, in accordance with some implementations. As depicted schematically in FIG. 4, a frequency selector 402 may select a set of randomized frequencies $\{f_j\}$ for each of sensing times (events) $t_i$. In some implementations, frequency selector 402 can select a working range of frequencies, such as m frequencies of a total number M of available frequencies. For example, the available frequencies can include a set of 1 MHz channels within the [2402 MHz, 2480 MHz] range of BT frequencies. In some implementations, m=M, whereas in other implementations, m<M. For each sensing event, frequency selector 402 may select l frequencies to be used in sensing signals that are transmitted to a return device and received from the return device. In some implementations, l=m, whereas in other implementations, l<m. In some implementations, each frequency $f_j$ is selected randomly. In some implementations, each frequency $f_j$ is selected pseudo-randomly. In particular, selected frequencies may appear as random to an outside observer but may be generated deterministically, e.g., based on a secret key and/or in any other way that may be agreed upon by the communicating wireless devices (e.g., a device that perform tracking and a target device). In some implementations, as described in more detail below, the probability of selecting a particular frequency $f_j$ may depend on the time that has elapsed since the last time this frequency was selected.

The wireless device hosting frequency selector 402 may then prepare and transmit sensing signals having the selected frequencies and may receive the returned signals with the same frequencies. The phase and amplitude information carried by the returned signals may be used by the wireless device to generate a limited set $\{r(f_j, t_i)\}$ of randomized sensing values 404, in which a fraction of l/m sensing values is known while a fraction of 1–l/m of sensing values is missing. At block 410, the wireless device may perform a reconstruction of sensing values to obtain a reconstructed set $\{R(f_j, t_i)\}$ of sensing values, as described in more detail below. In particular, reconstruction of sensing values may include signal folding/unfolding 412, path removal/restoration 414, and interpolation 416. In the implementations that deploy frequency interpolation, sensing values $\{r(f_j, t_i)\}$ may first be transformed using an appropriate folding transformation, removing (temporarily) one or more strong paths of propagation, performing interpolation 416, restoring the removed paths of propagation, and finally using an unfolding transformation to obtain a full set $\{R(f_j, t_i)\}$ of reconstructed signals 420. Object tracking and/or trajectory estimation 430 may then be performed from the set of reconstructed signals 420 using any suitable techniques, including but not limited to any of the techniques described above. In the implementations that deploy temporal interpolation, sensing values $\{r(f_j, t_i)\}$ may first be padded (e.g., with zero values in place of the missing sensing values) or otherwise interpolated in the time domain before being then interpolated in the spectral representation using the Whittaker-Shannon techniques or any other suitable interpolation to obtain the full set $\{R(f_j, t_i)\}$ of reconstructed signals 420.

In some implementations, interpolation in the spectral representation may include using a low-pass filter 418.

Figure 5A:
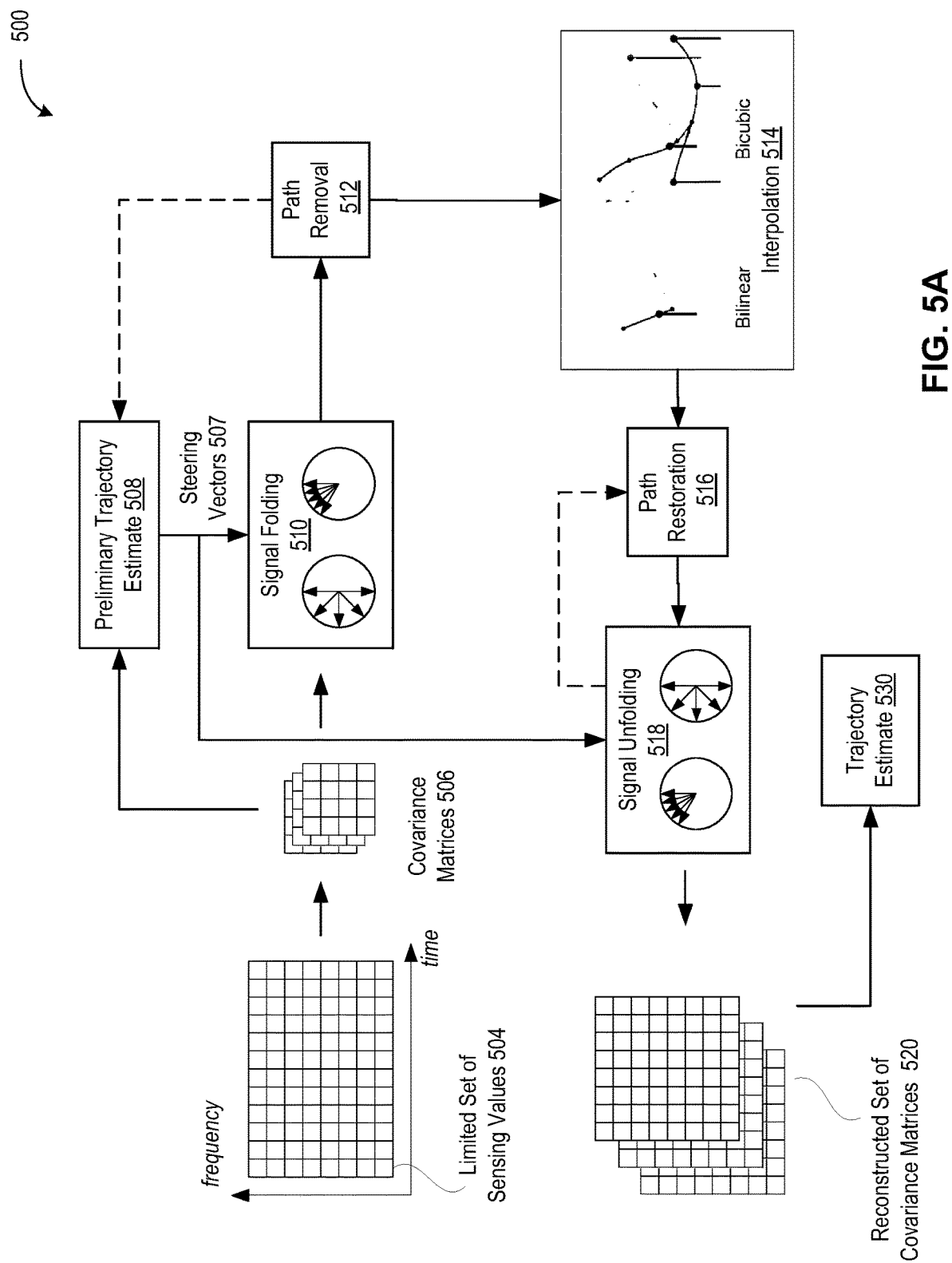
FIGS. 5A-B illustrates reconstruction of sensing values from a limited set of sensing signals of random frequencies, in accordance with some implementations.

FIG. 5A illustrates reconstruction of sensing values 500 from a limited set of sensing signals of random frequencies, in accordance with some implementations. Shown schematically is a limited set of sensing values 504 (depicted as a grid) obtained using m sensing frequencies $f_1, f_2 \ldots f_m$ (the vertical axis) and multiple sensing events/times (the horizontal axis). Each shaded cell of the grid represents a sensing value $r(f_j, t_i)$ obtained using a sensing signal with frequency $f_j$ during a sensing event that occurs at time $t_i$. During each sensing event, l sensing values may be obtained corresponding to l frequencies selected for that particular event. In some implementations, frequencies $f_j$ may be selected randomly or pseudo-randomly. The white cells in the limited set of sensing values 504 depict sensing values (frequencies) that have not been selected (and measured) during a respective event and are, therefore, missing. In some implementations, to obtain a reconstructed set of sensing values 520, a wireless device tracking another device (the return device), may perform the following operations.

In one non-limiting implementation, for each sensing event $t_i$ (where $i=1 \ldots n$), a processing unit of the wireless device may construct an l×l covariance matrix $R_{jk}(t_i)=r(f_j, t_i)r^*(f_k, t_i)$. As a result, n covariance matrices 506 may be constructed. Covariance matrices 506 may then be used to obtain a preliminary trajectory estimate 508 of the responding device, $d(t)=d_0+vt$, e.g., as described above. For example, the processing unit may covariance matrices $R_{jk}(t_i)$ by steering vectors $a_j(d)=\exp[4\pi i f_j d/c]$, form a suitable evaluation measure (e.g., the likelihood tensor) and determine the trajectory parameters $d_0$ and $v$ (or $\vec{r}_0$ and $\vec{v}$) from the optimization of this measure. In some implementations, the trajectory parameters can be determined using some other techniques, e.g., GCC method, correlating signals for different sensing frequencies and events. In some implementations, velocity and distance may be estimated using separate techniques, e.g., velocity may be estimated from correlations of signals obtained using the same sensing frequencies for different sensing events and distance may be estimated using time-of-flight techniques. In some implementations, velocity may be estimated based on distances measured at two (or more) different times. In some implementations, estimates of distances and/or velocities may be improved by filtering techniques, e.g., by using a Kalman filter or any similar filters. In some implementations, all n covariance matrices 506 may be used for the trajectory estimation. In some implementations, only some (e.g., two, three, etc.) of covariance matrices 506 may be used for the trajectory estimation.

The determined parameters $d_0$ and $v$ may then be used to obtain the steering vectors 507, e.g., $a_j(t_i)=\exp[4\pi i f_j i(d_0+v t_i)/c]$, for each of the n sensing events. The obtained steering vectors may then be used to transform (signal folding 510) each of the n available l×l covariance matrices $R_{jk}(t_i)$ to obtain a set of n folded matrices. In one implementation, this may be done by computing the element-by-element (Hadamard) multiplication of the covariance matrices $R_{jk}(t_i)$ with the dyadic product $F_{jk}(t_i)$ of the steering vectors, $T_{jk}(t_i)=F_{jk}(t_i)R_{jk}(t_i), F_{jk}(t_i)=a_j(t_i)a^*_k(t_i)$.

Elements of the folded (transformed) covariance matrices $T_{jk}(t_i)$ may be dominated by one or more strong paths of signal propagation, e.g., the line-of-sight path, a strong reflection (e.g., from a nearby wall) path, and so on. Because such strong path(s) can skew reconstruction (interpolation) of weaker paths, a processing loop can perform path removal 512 of one or more strong paths of signal propagation. In some implementations, a strong path may be removed by determining a mean element of a given folded covariance matrix $T_{jk}(t_i)$ and subtracting that mean element from $T_{jk}(t_i)$, to obtain a reduced folded matrix, e.g., $$R'_{jk}(t_i) = T_{jk}(t_i) - \overline{T_{jk}}(t_i), \overline{T_{jk}}(t_i) = \frac{1}{l^2}\sum_{j,k=1}^{l} T_{jk}(t_i).$$

The obtained (first-order) reduced folded matrices $R'_{jk}(t_i)$ may then be used as part of a removal loop indicated by a dashed arrow in FIG. 5A. More specifically, new eigenvectors of at least some of the reduced covariance matrices $R'_{jk}(t_i)$ may be computed and used to update the trajectory parameters $d'_0$ and $v'$ (or $\vec{r}'_0$ and $\vec{v}'$). The updated parameters $d'_0$ and $v'$ may subsequently be used to update the steering vectors 507, e.g., $a'_j(t_i)=\exp[4\pi i f_j(d'_0+v't_i)/c]$, for each or at least some of the n sensing events. The obtained steering vectors may then be used to transform (signal folding 510) each or at least some of the n available l×l covariance matrices $R_{jk}(t_i)$ to obtain a set of new folded matrices, e.g., $T'_{jk}(t_i)=F'_{jk}(t_i)R'_{jk}(t_i)$, using the dyadic product of the updated steering vectors, $F'_{jk}(t_i)=a'_j(t_i)a'^*_k(t_i)$. The second strong path may then similarly be removed by subtracting the mean element $\overline{T'_{jk}}(t_i)$ from the matrix $T'_{jk}(t_i)$, to obtain the second-order reduced covariance matrix $R''_{jk}(t_i)=T'_{jk}(t_i)-\overline{T'_{jk}}(t_i)$. This loop processing may be continued to remove any predetermined number (e.g., one, two, three) of strong paths and obtain consecutively-ordered reduced covariance matrices $R'_{jk}(t_i)$, $R''_{jk}(t_i)$, $R'''_{jk}(t_i)$, etc.

After the predetermined number of paths has been removed, the processing unit of the wireless device may perform interpolation 514. For example, if two paths have been removed, interpolation 514 may be performed based on the second-order reduced covariance matrix $R''_{jk}(t_i)$. In some implementations, interpolation 514 may be performed both in the time domain and the frequency domains, e.g., using linear interpolation, cubic interpolation, and the like. For example, the covariance matrices may be presumed to be functions of the difference of frequencies $f_j-f_k$, $R''_{jk}(t_i) \approx R''(f_j-f_k, t_i)$.

Whereas for the folding matrices $F_{jk}(t_i)$ this property may be satisfied by construction, the same may be taken as an approximated for the measured covariance matrices. Accordingly, the expanded m×m reduced covariance matrix $R''(f_j-f_k, t_i)$ may be obtained by from the available values of n reduced covariance matrices $R''(f_j-f_k, t_i)$, of the smaller size l×l. In particular, each covariance matrix $R''(f_j-f_k, t_i)$ may include information about 2l−1 different values of $R''(f_j-f_k, t_i)$ corresponding to the frequency differences $f_j-f_k \in [-(l-1)\Delta f, (l-1)\Delta f]$. In some implementations, each value $R''(f_j-f_k, t_i)$ may be obtained by averaging over multiple matrix elements $R''_{jk}(t_i)$ with a given difference $f_j-f_k$ (which may be visualized as elements belonging to various bottom-left/top-right diagonals of $R''_{jk}(t_i)$ matrices). For example, in an l×l covariance matrix there may be $l-|f_j-f_k|/\Delta f$ elements (with various $f_j$ and $f_k$) with the same value of the difference $f_j-f_k$. Each value $R''(f_j-f_k, t_i)$ may be obtained by averaging over all (or a subset) of such elements.

Correspondingly, the expanded m×m reduced covariance matrix $R''_{jk}(t_i)$ may be interpolated from 2l−1 different values (in general, non-contiguous) available for each of n sensing times $t_i$. Any suitable techniques of a two-dimensional interpolation (e.g., bilinear interpolation, bicubic interpolation) may be used. The output of interpolation 514 may be the expanded m×m reduced covariance matrix $R''_{jk}(t_i)$. The processing units of the wireless device may then perform another loop processing (as indicated with the dashed arrow) that includes path restoration 516 and signal unfolding 518. More specifically, in the example where matrix $R''_{jk}(t_i)$ is a second-order reduced matrix (obtained following removal of two paths), path restoration 516 and signal unfolding 518 may be performed as follows, $$R_{jk}(t_i) = F'^*_{jk}(t_i)[F'^*_{jk}(t_i)(R''_{jk}(t_i) + \overline{T'_{jk}}(t_i)) + \overline{T_{jk}}(t_1)].$$

The unfolding transformation matrices $F'^*_{jk}(t_i)$ and $F^*_{jk}(t_i)$ are m×m matrices build from the same steering vectors as used in the respective folding matrices $F'_{jk}(t_i)$ and $F_{jk}(t_i)$, with one difference being that the unfolding matrices are full m×m matrices whereas the folding matrices are smaller l×l matrices. In particular, the unfolding matrix $F'^*_{jk}(t_i)$ may be determined by parameters $d'_0$ and $v'$ and the unfolding matrix $F^*_{jk}(t_i)$ may be determined by parameters $d_0$ and $v$. The obtained unfolded matrix $R_{jk}(t_i)$ represents a characterization of the full reconstructed set of covariance matrices 520, which may then be used to determine the trajectory of the return object, e.g., $d(t) = d_0 + vt$, or $\vec{r} = \vec{r}_0 + \vec{v}t$.

The implementations described in conjunction with FIG. 5A deploy two-dimensional interpolation in the space of $f_j - f_k$ and $t_i$ with the additional approximation that the covariance matrices depend on the difference of frequencies. In some implementations, the interpolation may be performed in the three-dimensional space $f_j$, $f_k$, $t_i$ without additional assumptions regarding the frequency dependence.

Figure 5B:
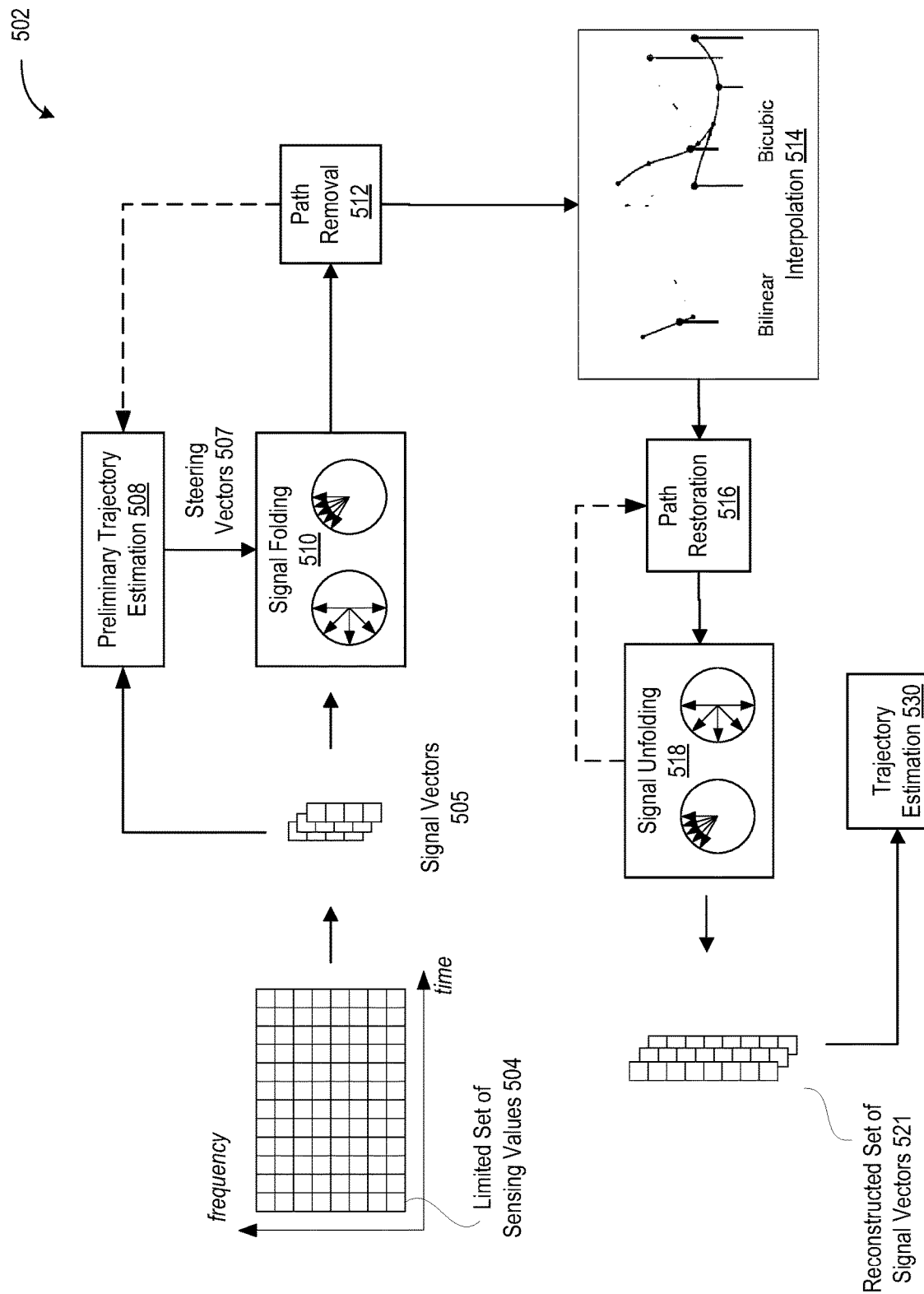

FIG. 5A and the corresponding description above illustrate one possible technique of obtaining a reconstructed set of sensing values 520, various other modifications of reconstruction of sensing values are within the scope of this disclosure. More specifically, as illustrated in FIG. 5B, in some implementations, the processing units of the wireless device may perform reconstruction based on signal vectors 505 made of the sensing values $r(f_j, t_i)$ directly, without forming covariance matrices $R_{jk}(t_i)$. In such implementations, sensing values $r(f_j, t_i)$ may be treated as n signal vectors (e.g., l-component vectors) that are folded using steering vectors: $t(f_j, t_i) = r(f_j, t_i) a_j(t_i)$. One or more strong paths can then be removed, e.g., by subtracting one or more mean values, e.g., $r'(f_j, t_i) = t(f_j, t_i) - \overline{t(t_i)}$, where $\overline{t(t_i)} = \Sigma j = 1^l t(f_j, t_i)$. The corresponding reduced sensing vectors, e.g. $r'(f_j, t_i)$, $r''(f_j, t_i)$, etc., may then be used to perform interpolation from l different sensing values (in general, non-contiguous) available for each of n sensing times $t_i$. The processing units of the wireless device may then perform another loop of path restoration 516 and signal unfolding 518, e.g., using the inverse steering vectors $a^*_j(t_i)$. The obtained unfolded signal vectors $r(f_j, t_i)$ represent a characterization of the full reconstructed set of signal vectors 521, which may then be used to determine the trajectory of the return object, as described above.

Figure 6A:
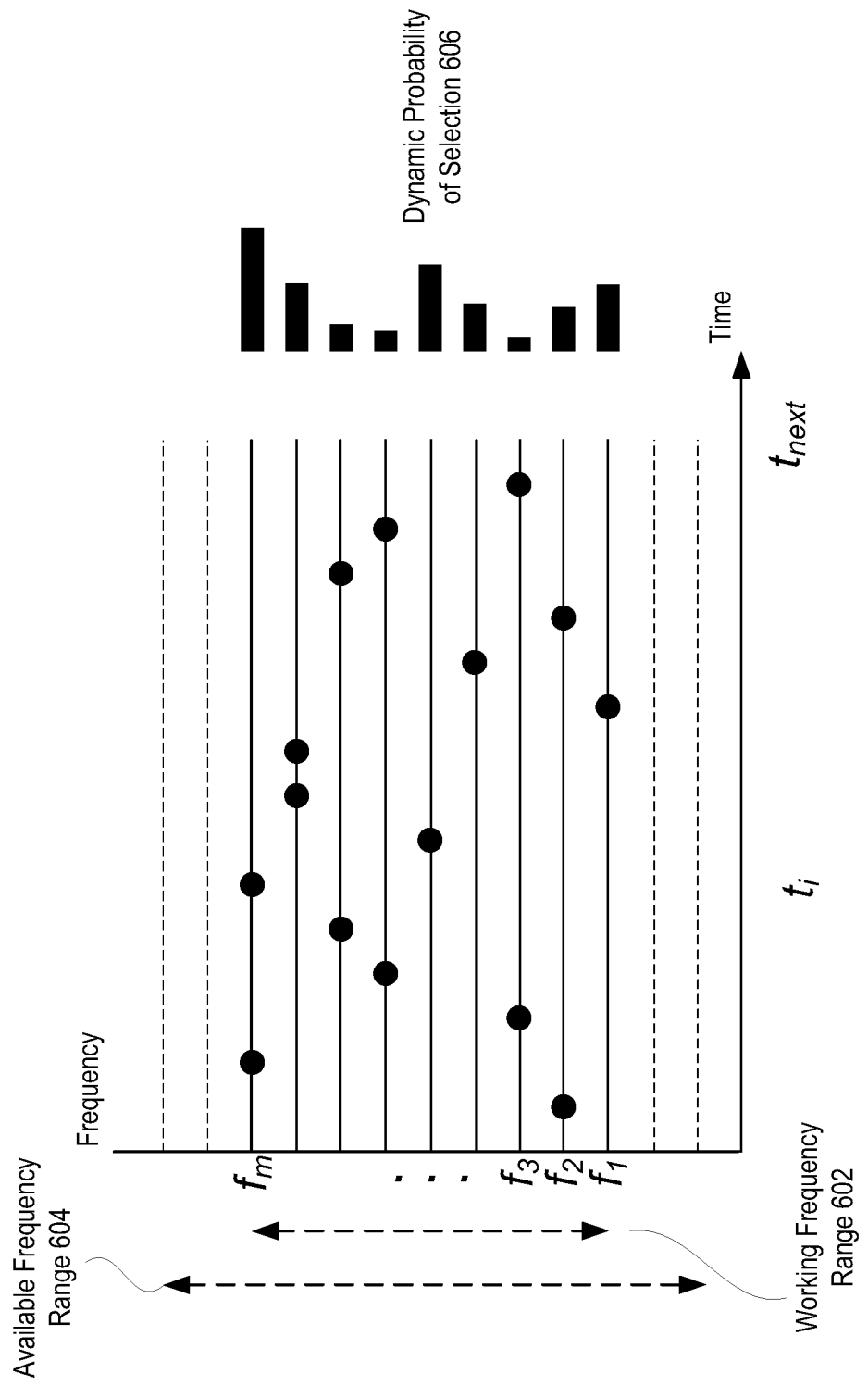
FIGS. 6A-B illustrate frequency selection and reconstruction of sensing values in the temporal domain, in accordance with some implementations.
Figure 6B:
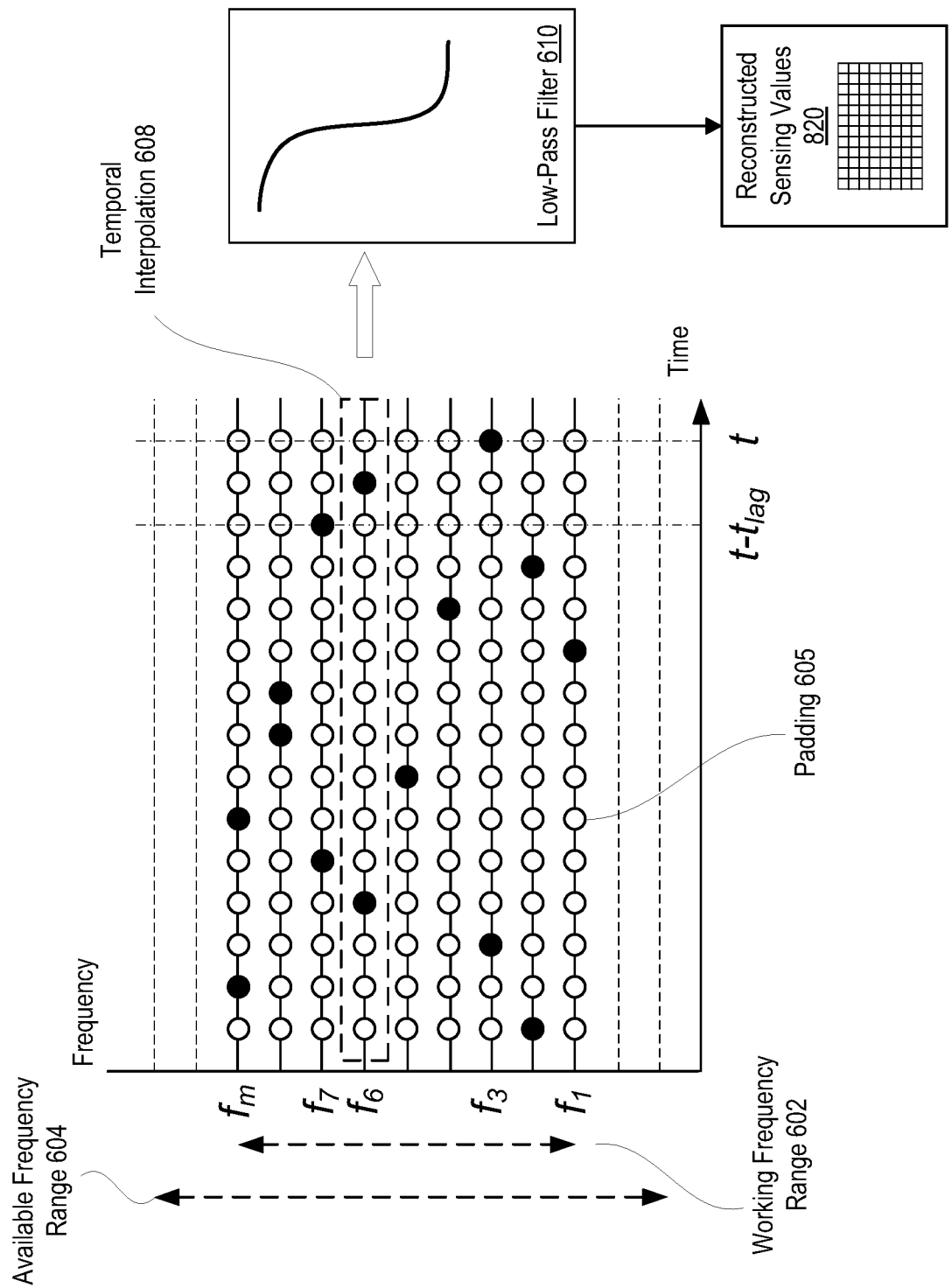

FIGS. 6A-B illustrate frequency selection and reconstruction of sensing values in the temporal domain, in accordance with some implementations. Depicted schematically (with solid horizontal lines) in FIG. 6A is a working frequency range 602 having m frequencies $f_1, f_2 \ldots f_m$, which may represent a subset of the whole available frequency range 604 (corresponding to both solid and dashed horizontal lines). Although the working frequency range 602 has a contiguous range of frequencies, this is not a requirement and any non-contiguous frequency range may be used.

During each of the sensing events $t_j$, one or more frequencies $f_j$ may be selected. For brevity, conciseness, and ease of illustration, only a single frequency is shown to be selected (as indicated with a black circle) during each sensing event. It should be understood, however, that any number of frequencies may be selected during a single sensing event. Sensing signals that use the selected frequencies may be transmitted sequentially, such that a single frequency signal is transmitted and received over a certain time (e.g., 0.3 ms). In some implementations, sensing signals of different frequencies may be transmitted and received concurrently. In some implementations, frequency selection for a specific sensing event, e.g., event $t_{next}$ may be performed probabilistically, using a dynamic probability of selection 606. For example, the dynamic probability may be constructed in such a way as to ensure that each frequency $f_j$ is selected at least once every time interval $\tau_{max}$, during which N sensing signals are transmitted and received (e.g., $N = \tau_{max}/0.3$ ms). Accordingly, a particular frequency $f_j$ has not been selected for time $\tau_j$, the probability $P_j$ to select this frequency $f_j$ for the next sensing event $t_{next}$ may be an increasing function of $\tau_j$, e.g.

$$P_j = \frac{A}{\tau_{max} - \tau_j},$$

where A can be any suitably-chosen coefficient. In some implementations, or any other function of $\tau_{max}$ and $\tau_j$ can be used. In some implementations, when $\tau_j$ reaches or exceeds $\tau_{max}$, to avoid large (infinite) values, the probability $P_j$ can be replaced with some fixed value.

The lengths of horizontal bars in FIG. 6A illustrate the concept of the dynamic probability. For example, frequency $f_m$ has not been selected during any of the nine most recent sensing events; as a result, the probability to select frequency $f_m$ during the next sensing event is large. On the other hand, frequency $f_3$ has been selected during the most recent sensing event; as a result, the probability to select frequency $f_3$ is small.

In some implementations, if none of n=N-1 most recent sensing events have selected a particular frequency $f_j$, this frequency may be selected with certainty during the next sensing event. In some implementations, the number N of sensing events during time interval $\tau_{max}$ may be sufficiently large (and, therefore, the time $\tau_{max}$ may be sufficiently long) that all m sensing frequencies are likely to be selected during N consecutive sensing events. For example, if l frequencies are selected during each sensing events, it would take on average N/l sensing events to select each sensing frequency. Hence, the number N of sensing events during time interval $\tau_{max}$ may be at least $N \geq m/l$. In some implementations, the number N of sensing events during time interval $\tau_{max}$ may be substantially larger than m/l, to reduce the likelihood of frequency "collisions." A frequency collision refers to a situation where, during any given sensing event, more than 1 frequencies have not been selected during the last N-1 sensing events. Accordingly, the number N may be chosen sufficiently large so that the probability of a frequency collision is less than a target threshold, e.g., less than 5%, 2%, or any other value that is set in view of a target accuracy, e.g., based on a type and nature of application 303 that uses device/object tracking. In some implementations, the coefficient A in the above example formula can be selected to normalize the probabilities:

$$A = \sum_{k=1}^{m} \frac{1}{\tau_{max} - \tau_k},$$

so that one frequency is selected during each sensing event.

Each black circle in FIG. 6A may be associated with a sensing value $r(f_j, t_i)$ measured upon the return of the corresponding sensing signal. The resulting set $\{r(f_j, t_i)\}$ represents the limited set of randomized sensing values 404 of FIG. 4. FIG. 6B illustrates interpolation from the limited set $\{r(f_j, t_i)\}$ to a reconstructed set of sensing values $\{R(f_j, t_i)\}$ 420 that are defined for all frequencies within the working range of frequencies 602. It should be understood that various interpolation schemes may be used to accomplish reconstruction of the sensing values. In one non-limiting illustration, the interpolation may use the Whittaker-Shannon techniques. More specifically, the missing sensing values, depicted by the white circles in FIG. 6B may be replaced with zeros (padding 605). Subsequently, the padded sensing values $r_{pad}(f_j, t_i)$ associated with the same frequency $f_j$ and different values of $t_i$ may undergo temporal interpolation 608, which may include transforming the padded sensing values $r_{pad}(f_j, t_i)$ to a spectral representation with respect to time $t_i$: $r_{pad}(f_j, t_i) \rightarrow r_{pad}(f_j, \Omega)$, applying a low-pass filter to limit the spectral representation to the values of spectral frequency $\Omega$ to those below a certain threshold, $\Omega < \Omega_0$, and then performing an inverse spectral transformation to obtain reconstructed sensing values, $r_{pad}(f_j, \Omega < \Omega_0) \rightarrow R(f_j, t_i)$. Any suitable low-pass filter may be used. For example, if a "brick-wall" low-pass filter is used, the reconstructed sensing values $R(f_j, t_i)$ may be represented with the convolution of the padded sensing values $r_{pad}(f_j, t_i)$ with the sinc-function, $\sin(\Omega_0 t_i)/[2\pi t_i]$. It should be understood that the brick-wall low-pass filter is merely one possible implementation and that any other known low-pass filters may be used instead. In some implementations, the low-pass filter may be adaptive. In some implementations, a Wiener filter may be used in addition to (or in place of) the low-pass filter. This process of interpolation and filtering may be performed for each temporal slice (indicated with the shaded box in FIG. 6B) of the padded sensing values. The obtained reconstructed set $\{R(f_j, t_i)\}$ of sensing values 820 may then be used to determine the trajectory of the return object, e.g., $d(t)=d_0+vt$, or $\vec{r} = \vec{r}_0 + \vec{v} t$, as described in more detail above. Numerous other variations of the temporal interpolation 608 and filtering using low-pass filter 610 may be used. For example, in some implementations, the inverse spectral transformation is not used and the trajectory determination may be performed directly based on the filtered spectral representation $r_{pad}(f_j, \Omega < \Omega_0)$ of the padded sensing values. In some implementations, any suitable interpolation in the time domain (e.g., a linear interpolation or a cubic interpolation) may be used instead of padding 605.

In some implementations, the reconstruction may be performed with a time lag $t_{lag}$. For example, at time t, the reconstruction may be performed for up to time $t-t_{lag}$ using the sensing values obtained up to the current time t. This may increase the accuracy of reconstruction. More specifically, when reconstruction is performed up to time t, most frequencies $f_j$ may have missing sensing values for the most recent sensing events. As illustrated in FIG. 6B, only one frequency $f_3$ is associated with a sensing value obtained during the most recent sensing event. As a result, reconstruction of the sensing values for the most recent sensing events (for all frequencies except $f_3$) may involve extrapolation from the past sensing events (black dots). On the other hand, when reconstruction is performed for the sensing events up to time $t-t_{lag}$, additional frequencies $f_6$ and $f_7$ have sensing values that have been obtained between times $t-t_{lag}$ and t. As a result, reconstruction of more frequencies (e.g., $f_3$, $f_6$, and $f_7$) may involve interpolation between past sensing values (obtained before time time $t-t_{lag}$) and "future" sensing values (obtained between time $t-t_{lag}$ and time t). Such lag-based interpolation reconstruction may be more precise compared with the extrapolation reconstruction (without a lag), and may be preferred when accuracy of the trajectory determination is important. In some implementations, when the speed of trajectory determination is more important than accuracy, extrapolation reconstruction (without a lag) may be performed.

Figure 7:
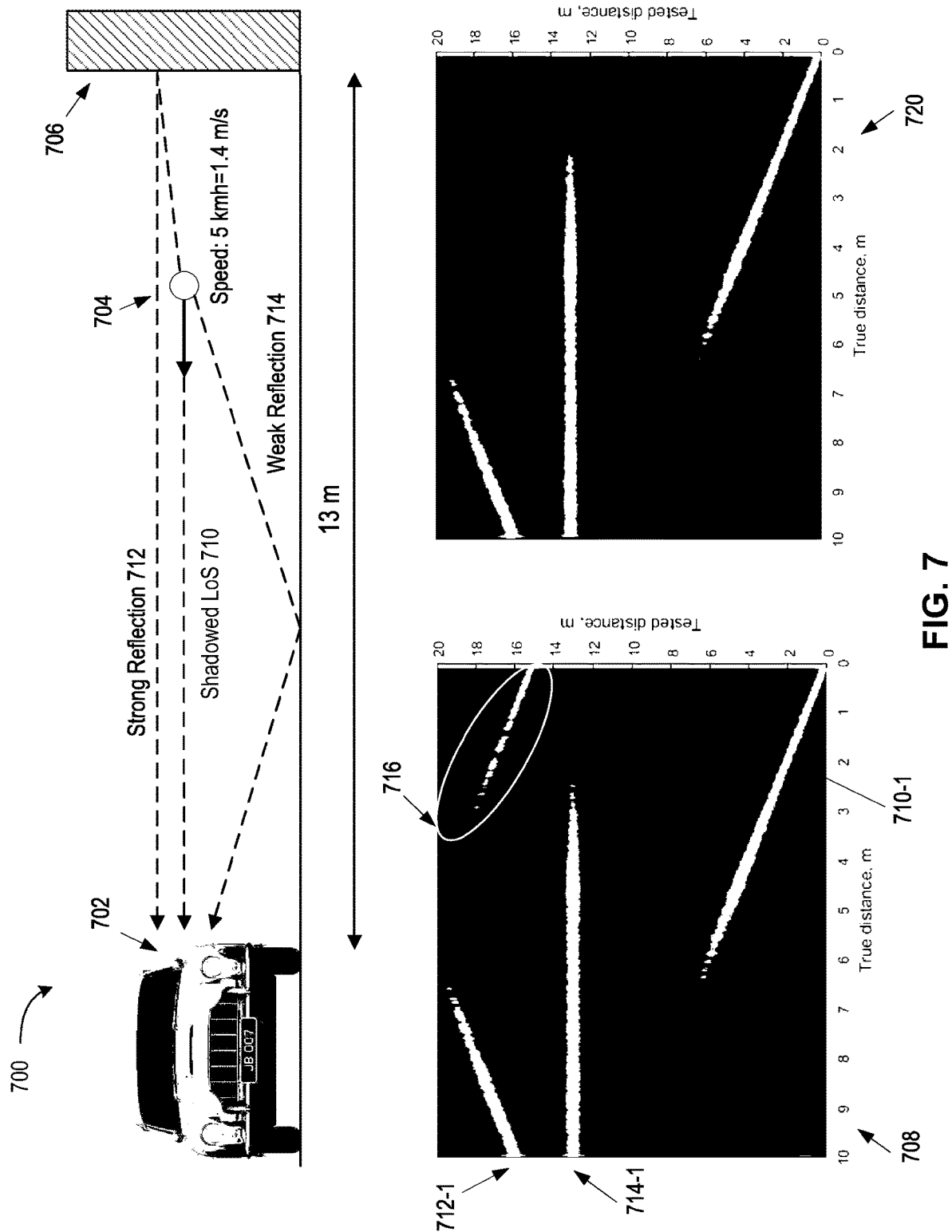
FIG. 7 illustrates advantages of using a low-pass filter in reconstruction of sensing values in temporal domain, in accordance with some implementations.

FIG. 7 illustrates advantages of using a low-pass filter in reconstruction of sensing values in temporal domain, in accordance with some implementations. The environment 700 of a wireless device 702 located on or at a vehicle includes a return device 704 (e.g., a key fob carried by the owner of the vehicle), and a wall 706 capable of reflecting radio signals. Return device 704 is moving towards wireless device 702 with the speed of 5 km per hour. Three paths of wireless signal propagation include a direct line-of-sight (LoS) path experiencing shadowing 710, a strong reflection 712 from wall 706, and a weak reflection 714 from the ground. FIG. 7 also shows estimations of distance from the wireless device to the return device 704 in a situation where the distance from wireless device to wall 706 is approximately 13 m. Left image 708 is a heat map depicting detected (tested) distances d to the return device 704 as a function of the true distance D between wireless device 702 and return device 704 detected using temporal interpolation of sensing signals without low-pass filtering. As a result of the existence of multiple paths of signal propagation, multiple distances d are detected. More specifically, the line 710-1 corresponds to the direct LoS path, $d_1=D$; the line 712-1 corresponds to the signal reflected from the wall, $d_2=26$ m$-D$; and the line 714-1 corresponds to a combination of lines 712-1 and 714, $d_3=13$ m. Such a combination can arise in a situation where a sensing signal from wireless device 702 propagates to the return device 704 over the LoS path while the return signal reflects from wall 706 (or vice versa). An additional ghost line 716, $d_2=15$ m$+D$, is caused by distance aliasing at the frequency step $\Delta f=10$ MHz, with the maximum resolved distance of $d_{max}=c/2\Delta f=15$ m. Right image 720 is a heat map depicting the detected (tested) distances d to the same return device 704 in an implementation that uses low-pass filtering. As illustrated by right image 720, filtering out the low portion of the spectral representation of the reconstructed set of sensing values eliminates the ghost line 716 that is present in unfiltered left image 708.

Figure 8:
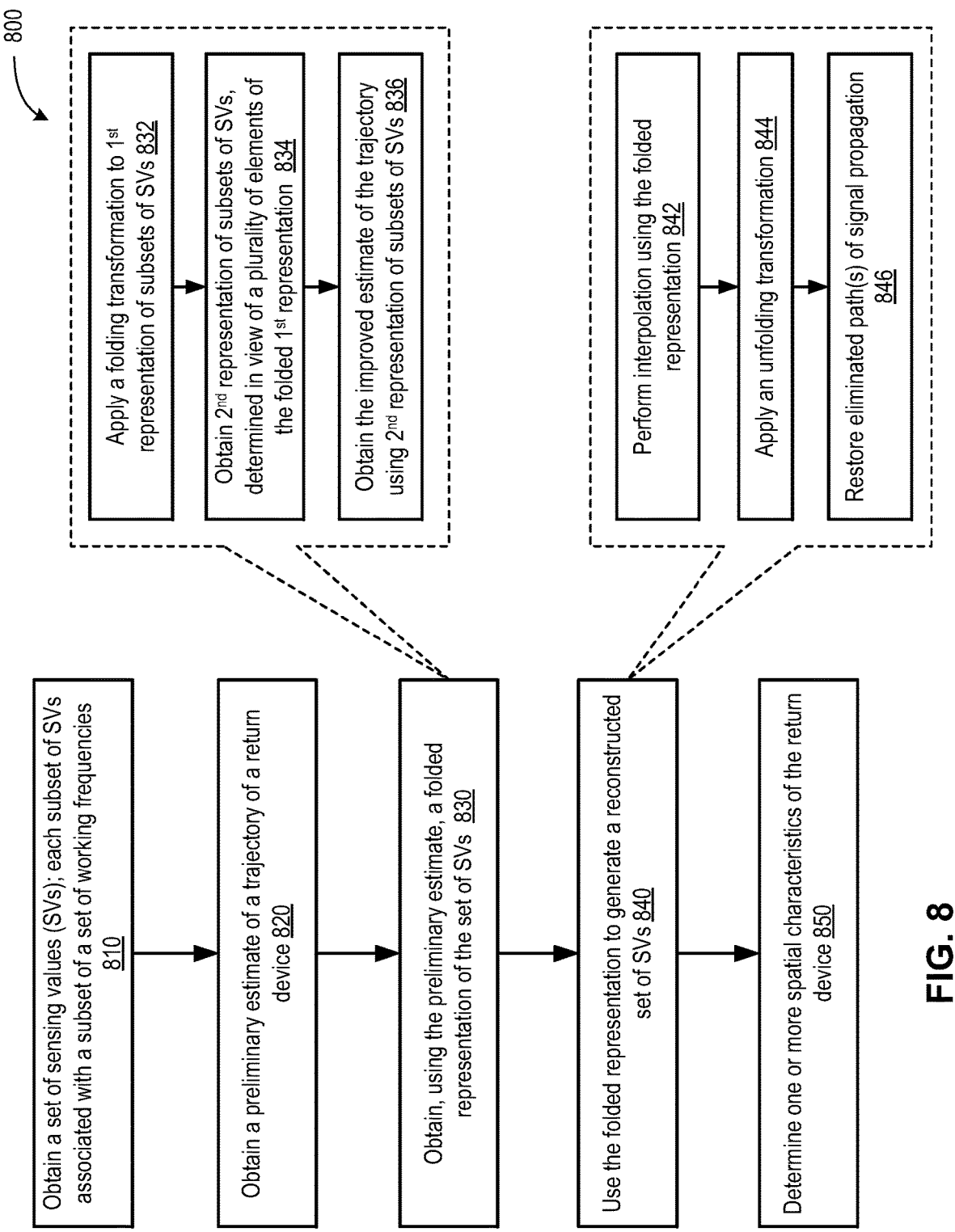
FIG. 8 is a flow diagram of an example method that uses reconstruction of sensing values a limited set of sensing signals of random frequencies, in accordance with some implementations.
Figure 9:
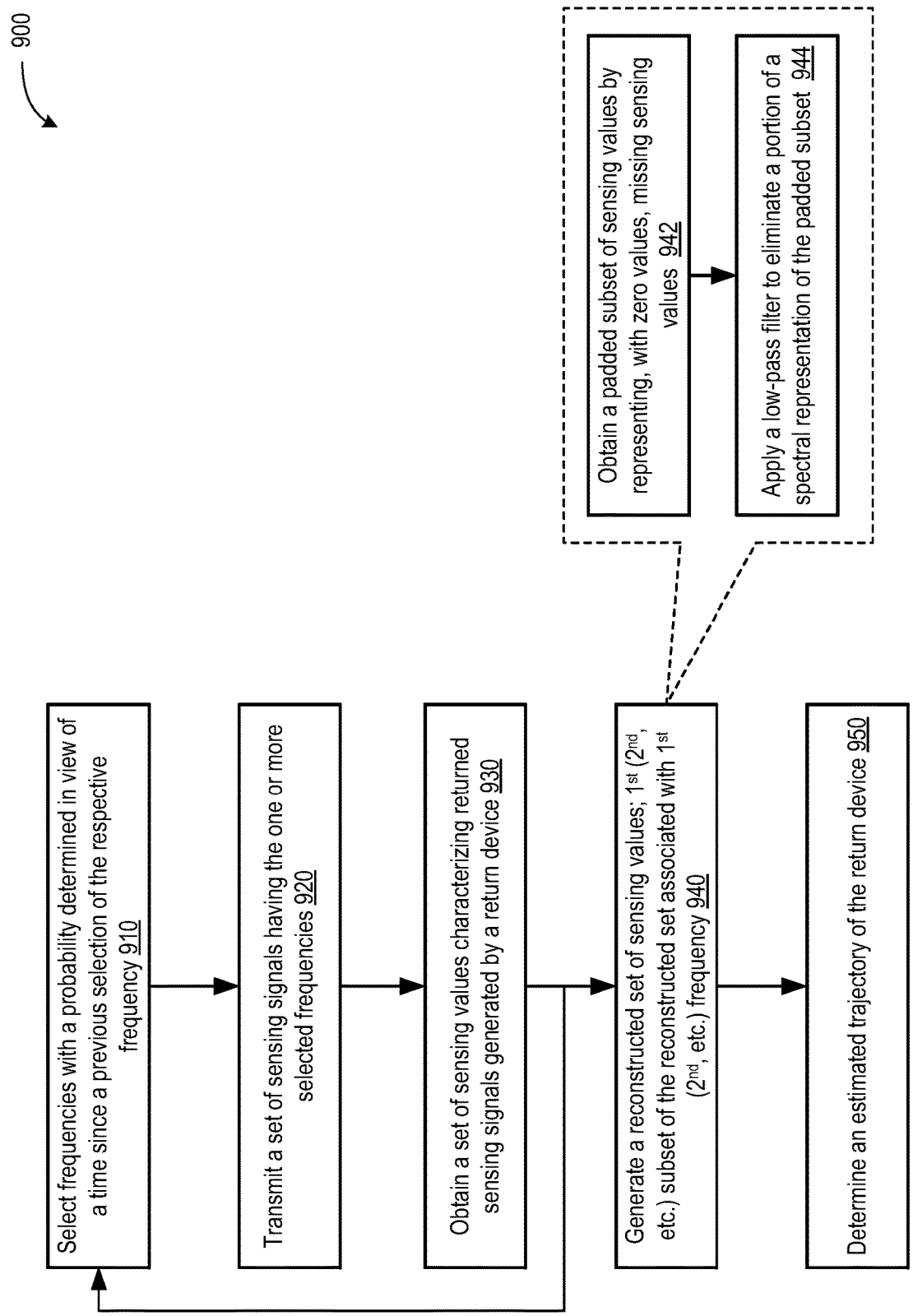
FIG. 9 is a flow diagram of an example method that uses frequency selection and reconstruction of sensing values in temporal domain for efficient tracking of wireless devices, in accordance with some implementations

FIGS. 8-9 are flow diagrams of example methods 800-900 that use sensing signals with randomized frequencies for efficient determination and tracking of trajectories of objects in an environment of a wireless device, in accordance with some implementations. Methods 800-900 may be performed to identify distance from one or more objects in the outside environment. Methods 800-900 may be performed by a BT wireless device, a BLE wireless device, a WLAN wireless device, or any other suitable wireless device or apparatus. The wireless device may also include a radio configured to transmit, using one or more antennas, a plurality of sensing radio waves, e.g., Bluetooth sensing waves, Bluetooth Low Energy sensing waves, or Wi-Fi sensing waves. Methods 800-900 may be performed by a wireless controller of the wireless device, e.g., controller 350 of FIG. 3A. The controller may include a memory (e.g., memory 360) and a processing device (e.g., processor 352) communicatively coupled to the memory. The processing device may include hardware (e.g., circuitry, dedicated logic, programmable logic, microcode, etc.), firmware, and/or software, or any combination thereof. The controller 350 may receive data from radio 310, PHY 320, and other components/modules. In some implementations, the processing device performing methods 800-900 may execute instructions of data reconstruction engine 364. In certain implementations, each of methods 800-900 may be performed by a single processing thread. Alternatively, each of methods 800-900 may be performed by two or more processing threads, each thread executing one or more individual functions, routines, subroutines, or operations of the corresponding method. The processing threads implementing methods 800-900 may be synchronized (e.g., using semaphores, critical sections, and/or other thread synchronization mechanisms). Alternatively, the processing threads implementing methods 800-900 may be executed asynchronously with respect to each other. Various operations of methods 800-900 may be performed in a different order compared with the order shown in FIGS. 8-9. Some operations of methods 800-900 may be performed concurrently with other operations. Some operations may be optional.

FIG. 8 is a flow diagram of an example method 800 that uses reconstruction of sensing values from a limited set of sensing signals of random frequencies, in accordance with some implementations. Method 800 may include collecting, by a wireless device, sensing data for a plurality of sensing events. More specifically, at block 810, method 800 may include obtaining a set of sensing values (e.g., a set $\{r(f_j, t_i)\}$) characterizing returned sensing signals received from a return device. The set of sensing values may include a plurality of subsets of sensing values. Each subset of the sensing values may be selected for a respective one of a plurality of sensing events, e.g., sensing event $t_1$, sensing event $t_2$, and so on. Each subset of sensing values may be associated with a respective subset of a set of working frequencies. For example, a subset $r(f_1, t_1), r(f_2, t_1) \ldots$ of sensing values may be associated with a subset $f_1, f_2 \ldots$ of working frequencies (e.g., the BT frequency range) selected during a sensing event $t_1$. In some implementations, each subset of frequencies $f_1, f_2 \ldots$ is selected pseudo-randomly. Each subset of frequencies may be known to the return device (e.g., a device that is being tracked). In some implementations, the number of selected frequencies may be 8,10, etc., or any other number, per sensing event $t_i$.

At block 820, method 800 may continue with obtaining a preliminary estimate of a trajectory of the return device (e.g., $d(t)=d_0+vt$). For example, the wireless device may use two or more subsets of sensing values to determine a likelihood tensor (e.g. P(d, v)), and use the likelihood tensor to obtain the preliminary estimate of the trajectory, as disclosed in more detail above. At block 830, method 800 may continue with obtaining, using the preliminary estimate of the trajectory of the return device, a folded representation of the set of sensing values. The folded representation may be any suitable representation of sensing values, e.g., a folded covariance matrix of sensing values, a folded vector of sensing values, and so on. Additionally, the folded representation may be any of the above (or additional) examples from which one or more paths have been removed, e.g. the folded representation may include a set of matrices $R'_{jk}(t_i)$, provided that a single path has been removed, a set of matrices $R''_{jk}(t_i)$, provided that two paths have been removed, and so on.

In particular, as illustrated with the upper callout portion in FIG. 8, obtaining the folded representation of the set of sensing values may include one or more iterations. Each of the one or more iterations may include performing, for each of the plurality of subsets of the sensing values, operations of blocks 832-836. More specifically, at block 832, the processing device of the wireless device may apply a folding transformation to a first representation of each subset (or at least some subsets) of the sensing values. For example, the first representation of a subset of the sensing values may include a covariance matrix for the respective subset of the sensing values, e.g., $R_{jk}(t_i)$, or a vector of the sensing values, $r(f_j, t_i)$, as described in more detail above in conjunction with FIG. 9A and FIG. 9B. The folding transformation (e.g., transformation $T_{jk}(t_i)=R_{jk}(t_i)F_{jk}(t_i)$) may be based on the preliminary estimate of the trajectory. In particular, applying the folding transformation (e.g., $F_{jk}(t_i)$) to the first representation (e.g., $R_{jk}(t_i)$) of the respective subset of the sensing values may include applying a steering vector (e.g., $a_j(t_i)$, $a^*_k(t_i)$) to the respective subset of the sensing values, (e.g., $R_{jk}(t_i)F_{jk}(t_i)$, where $F_{jk}(t_i)=a_j(t_i)a^*_k(t_i)$). In some implementations, a phase of the steering vector (e.g., $a_j(t_i)=\exp[4\pi i f_j(d_0+vt_i)/c]$) may depend on a distance (e.g., $d=d_0+vt_i$, at the time of the sensing event $t_i$) to the return device. The distance to the return device $d_0+vt_i$ may be obtained using the preliminary estimate of the trajectory of the return device.

At block 834, method 800 may include obtaining a second representation (e.g., $R'_{jk}(t_i)=T_{jk}(t_i)-\overrightarrow{T_{jk}}$) of each subset of the sensing values by subtracting a value, determined in view of a plurality of elements of the folded first representation of the respective subset, from each of the plurality of elements of the folded first representation of the respective subset of the sensing values. For example, the plurality of elements of the folded first representation may include the elements of the matrix $T_{jk}(t_i)$ and the subtracted value $\overline{T_{jk}}$ may be the average value of the elements of the matrix $T_{jk}(t_i)$. The operations of block 834 may amount to removing a path of signal propagation between the wireless device and the return device. At block 836, method 800 may include obtaining the improved estimate of the trajectory, e.g., updating the preliminary estimate of the trajectory (e.g., updating $d_0$, $v \rightarrow d'_0$, $v'$) or otherwise computing the improved estimate of the trajectory using the second representation of two or more of the subsets of sensing values (e.g., using two or more matrices $R'_{jk}(t_i)$). In some implementations, the improved estimate of the trajectory may be computed using the same techniques as used for the preliminary estimate at block 830. In some implementations, the improved estimate may be computed using different techniques. Operations 832-836 may be repeated any predetermined number of times, e.g., depending on the number of paths of propagation to be removed.

At block 840, the processing device of the wireless device may use the folded representation of the set of sensing values to generate a reconstructed set of sensing values (e.g., matrix $R_{jk}(t_i)$). In some implementations, the folded representation of the set of sensing values may include a folded representation of each of the plurality of subsets of the sensing values (e.g., a set of matrices $R''_{jk}(t_i)$ for different sensing events $t_i$). The reconstructed set may include reconstructed sensing values for at least some (or all) of the set of working frequencies and for at least some of the plurality of sensing events. As illustrated with the lower callout portion in FIG. 8, using the folded representation of the set of sensing values to generate a reconstructed set of sensing values may include, at block 842, performing an interpolation using the folded representation for each of the plurality of subsets of the sensing values. In some implementations, the interpolation is performed between two or more frequencies of the set of working frequencies. In some implementations, the interpolation may be further performed between two or more times of the plurality of sensing events. At block 844, the processing device may apply an unfolding transformation to the interpolated folded representation, and, at block 846, may restoring the one or more paths of signal propagation between the wireless device and the return device. For example, restoring the one or more paths may include adding the previously subtracted mean values $\overline{T_{jk}}$, $\overline{\overline{T}}_{jk}$, etc., and applying an unfolding transformation may include applying the inverse folding transformation (e.g., $F^*_{jk}(t_j)$), as described in more detail in relation to FIG. 3A.

At block 850, method 800 may include determining, using the reconstructed set of sensing values, one or more spatial characteristics of the return device. The one or more spatial characteristics may include an improved estimate of the trajectory of the return device. In some implementations, operations of block 850 may any other operations that determine a distance to the return device, a velocity of the return device, a trajectory of the return device, e.g., a set of distances and/or velocities of the return device for a set of times, directions to the return device, and so on, using any suitable method, e.g., a method that uses a uniform frequency step or an uniform time step, such as MUSIC, and the like.

FIG. 9 is a flow diagram of an example method 900 that uses frequency selection and reconstruction of sensing values in temporal domain for efficient tracking of wireless devices, in accordance with some implementations. Method 900 may include collecting sensing data for a plurality of sensing events, with blocks 910-930 repeated for each sensing event. More specifically, at block 910, method 900 may include probabilistically selecting, by a wireless device (or a processing unit of the wireless device), one or more frequencies $f_j$. In some implementations, the number of selected frequencies may be 8, 10, etc., or any other number, per sensing event $t_i$. In some implementations, each frequency of the one or more frequencies $f_j$ is selected with a probability that is determined in view of a time (or a number of sensing events that occurred) since the previous selection of the respective frequency. For example, the probability to select a particular frequency may increase with the time since the previous selection of this frequency. In some implementations, the probability to select a particular frequency over a target interval of time (e.g., $\tau_{max}$, as described in conjunction with FIGS. 6A-B) is at least a threshold probability, e.g., 95%, 98%, etc. In some implementations, the threshold probability is a unity (100% probability). In some implementations, the target interval of time is determined in view of an expected maximum velocity $v_{max}$ of the return device, e.g., $\tau_{max}=c/(2f_j v_{max})$. In some implementations, selection of frequencies may be performed stochastically, e.g., pseudo-randomly. In some implementations, method 900 may include communicating, to the return device, the one or more selected frequencies. For example, the wireless device may select a number (e.g., one, two, four, ten, etc.) of frequencies and notify the return device of the selected frequency (e.g., during one of exchanges of sensing signals with the return device or via a separate communication). In some implementations, the probabilistic selection of frequencies may be performed during actual tracking of wireless devices. In some implementations, the probabilistic selection may be performed prior to tracking of wireless devices. For example, the initiator device may exchange, with a wireless device, previously selected frequencies or one or more parameters of the frequency selection algorithm. The parameters may include one or more seeds for a random generation function (or similar parameters), which define a starting point in a pseudorandom sequence.

At block 920, method 900 may continue with the wireless device transmitting, e.g., using a radio module, a set of sensing signals having the one or more selected frequencies $f_j$. At block 930, method 900 may include obtaining, by the wireless device, a set of sensing values characterizing returned sensing signals generated by a return device in response to receiving the set of sensing signals. All the sets of sensing values obtained for different sensing events $t_i$ may constitute a randomized limited set of sensing values $\{r(f_j, t_i)\}$ 404 of FIG. 4.

At block 940, method 900 may include generating, using the obtained sets of sensing values (which together constitute the limited set $\{r(f_j, t_i)\}$), a reconstructed set of sensing values (e.g., $\{R(f_j, t_i)\}$). The reconstructed set of sensing values may include multiple subsets. For example, a first (second, etc.) subset of the reconstructed set may be associated with a first frequency $f_1$ (second frequency $f_2$, etc.) of the one or more frequencies $\{f_j\}$ and may be generated using the sensing values associated with the first frequency $f_1$ (second frequency $f_2$, etc.) and obtained during one or more of the plurality of sensing events (e.g., multiple sensing events $t_1$, $t_2$, etc. In some implementations, the first (second, etc.) subset of the reconstructed set of sensing values is generated using interpolation from the sensing values associated with the first frequency (second frequency, etc.) and obtained during the one or more of the plurality of sensing events. In some implementations, as depicted with the callout portion in FIG. 9, the interpolation may include, at block 942, obtaining a padded subset of sensing values by representing, with zero values, missing sensing values associated with the first (second, etc.) frequency. At block 944, the interpolation may further include applying a low-pass filter to eliminate a portion of a spectral representation of the padded subset of sensing values.

At block 950, method 900 may include determining, using the reconstructed set of sensing values, an estimated trajectory of the return device. In some implementations, operations of block 950 may include any other operations that determine a distance to the return device, a velocity of the return device, a trajectory of the return device, e.g., a set of distances and/or velocities of the return device for a set of times, and so on, using any suitable method, e.g., MUSIC, GCC, and the like.

It should be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The implementations of methods, hardware, software, firmware or code set forth above may be implemented via instructions or code stored on a machine-accessible, machine readable, computer accessible, or computer readable medium which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation, implementation, and/or other examplar language does not necessarily refer to the same implementation or the same example, but may refer to different and distinct implementations, as well as potentially the same implementation.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A method comprising:
    obtaining, by a wireless device, a set of sensing values characterizing returned sensing signals received from a return device, wherein the set of sensing values comprises a plurality of subsets of sensing values, wherein each of the plurality of subsets of sensing values is associated with a respective subset of a set of working frequencies, the respective subset being selected for a respective one of a plurality of sensing events, each sensing event of the plurality of sensing events associated with a corresponding time of a plurality of times;
    obtaining a plurality of distributions of possible locations of the return device, an individual distribution of the plurality of distributions obtained for a respective time of the plurality of times and using a respective subset of sensing values of the plurality of subsets of sensing values;
    obtaining, using the plurality of distributions, a preliminary estimate of a trajectory of the return device characterizing motion of the return device across at least the plurality of times;
    obtaining, using the preliminary estimate of the trajectory of the return device, a folded representation of the set of sensing values;
    using the folded representation of the set of sensing values to generate a reconstructed set of sensing values, wherein the reconstructed set comprises reconstructed sensing values for at least some of the set of working frequencies and for at least some of the plurality of sensing events; and
    determining, using the reconstructed set of sensing values, one or more spatial characteristics of the return device.

2. The method of claim 1, wherein the respective subset of the set of working frequencies is selected pseudo-randomly, the selected subset being known to the return device.

3. The method of claim 1, wherein obtaining the folded representation of the set of sensing values comprises one or more iterations, each of the one or more iterations comprising:
    for each of the plurality of subsets of the sensing values, applying a folding transformation to fold a first representation of a respective subset of the sensing values, wherein the folding transformation is based on the preliminary estimate of the trajectory; and
    obtaining a second representation of the respective subset of the sensing values by subtracting a value, determined in view of a plurality of elements of the folded first representation of the respective subset, from each of the plurality of elements of the folded first representation of the respective subset of the sensing values; and
    obtaining the one or more spatial characteristics of the return device using the second representation of two or more of the subsets of the sensing values.

4. The method of claim 3, wherein the first representation of the respective subset of the sensing values comprises a covariance matrix for the respective subset of the sensing values.

5. The method of claim 3, wherein applying the folding transformation to the first representation of the respective subset of the sensing values comprises:
    applying a steering vector to the respective subset of the sensing values, wherein a phase of the steering vector depends on a distance to the return device, and wherein the distance to the return device is obtained using the preliminary estimate of the trajectory of the return device.

6. The method of claim 1, wherein the folded representation of the set of sensing values comprises a folded representation of each of the plurality of subsets of the sensing values, and wherein using the folded representation of the set of sensing values to generate a reconstructed set of sensing values comprises:
performing an interpolation using the folded representation for each of the plurality of subsets of the sensing values.

7. The method of claim 6, wherein the interpolation is performed between two or more frequencies of the set of working frequencies.

8. The method of claim 7, wherein the interpolation is further performed between two or more times of the plurality of sensing events.

9. The method of claim 6, wherein using the folded representation of the set of sensing values to generate the reconstructed set of sensing values further comprises:
applying an unfolding transformation; and
restoring one or more paths of signal propagation between the wireless device and the return device.

10. A method comprising:
for each of a plurality of sensing events associated with a corresponding time of a plurality of times,
selecting, by a wireless device, one or more frequencies;
transmitting, by the wireless device, a set of sensing signals having the one or more selected frequencies;
obtaining, by the wireless device, a set of sensing values characterizing returned sensing signals, wherein the returned sensing signals are received from a return device responsive to the transmitted set of sensing signals; and
obtaining, using the set of sensing values, a distribution of possible locations of the return device at the corresponding time;
generating, using the distributions of possible locations of the return device obtained for each of the plurality of sensing events, a reconstructed set of sensing values, wherein a first subset of the reconstructed set of sensing values is associated with a first frequency of the one or more frequencies and is generated using a first subset of the obtained sensing values, wherein the first subset of the obtained sensing values is associated with the first frequency and obtained during one or more of the plurality of sensing events; and
determining, using the reconstructed set of sensing values, one or more spatial characteristics of the return device.

11. The method of claim 10, wherein a respective frequency of the one or more frequencies is selected with a probability that increases with a time since a previous selection of the respective frequency, the method further comprising:
communicating, to the return device, the one or more frequencies selected by the wireless device.

12. The method of claim 10, wherein a respective frequency of the one or more frequencies is selected with a probability over a target interval of time that is at least a threshold probability.

13. The method of claim 12, wherein the threshold probability is a unity.

14. The method of claim 12, wherein the target interval of time is determined in view of an expected maximum velocity of the return device.

15. The method of claim 10, wherein a second subset of the reconstructed set of sensing values is associated with a second frequency of the one or more frequencies and is generated using a second subset of the obtained sensing values, wherein the second subset of the obtained sensing values is associated with the second frequency and obtained during at least one of the plurality of sensing events.

16. The method of claim 10, wherein the first subset of the reconstructed set of sensing values is generated using interpolation from the first subset of the obtained sensing values.

17. The method of claim 16, wherein the interpolation comprises:
obtaining a padded subset of sensing values by representing, with zero values, missing sensing values associated with the first frequency; and
applying a low-pass filter to eliminate a portion of a spectral representation of the padded subset of sensing values.

18. An apparatus comprising:
a radio configured to transmit a plurality of radio frequency (RF) signals, wherein each of the plurality of RF signals is transmitted according to a Bluetooth, a Bluetooth Low Energy, or a Wi-Fi protocol;
a memory; and
a processing device coupled to the memory, the processing device configured to:
obtain a set of signal values characterizing returned RF signals received from a return device in response to the transmitted RF signals, wherein the set of signal values comprises a plurality of subsets of signal values, each subset of sensing values of the plurality of subsets of signal values associated with a corresponding time of a plurality of times;
obtain a plurality of distributions of possible locations of the return device, an individual distribution of the plurality of distributions obtained for a respective time of the plurality of times and using a respective subset of signal values of the plurality of subsets of signal values;
obtain, using the plurality of distributions, a preliminary estimate of a trajectory of the return device characterizing motion of the return device across at least the plurality of times;
obtain, using the preliminary estimate of the trajectory of the return device, a folded representation of the set of signal values;
use the folded representation of the set of signal values to generate a reconstructed set of signal values; and
determine, using the reconstructed set of signal values, one or more spatial characteristics of the return device.

19. The apparatus of claim 18, wherein to obtain the folded representation of the set of signal values, the processing device to perform one or more iterations, each of the one or more iterations comprising:
for each of the plurality of subsets of the signal values,
apply a folding transformation to fold a first representation of a respective subset of the signal values, wherein the folding transformation is based on the preliminary estimate of the trajectory; and
obtain a second representation of the respective subset of the signal values by subtracting a value, determined in view of a plurality of elements of the folded first representation of the respective subset, from each of the plurality of elements of the folded first representation of the respective subset of the signal values; and obtain the one or more spatial characteristics of the return device using the second representation of two or more of the subsets of signal values.

20. The apparatus of claim 18, wherein the folded representation of the set of signal values comprises a folded representation of each of the plurality of subsets of the signal values, and wherein to use the folded representation of the set of signal values to generate a reconstructed set of signal values, the processing device is to:
perform an interpolation using the folded representation for each of the plurality of subsets of the signal values;
apply an unfolding transformation; and
restore one or more paths of signal propagation between the radio and the return device.

\* \* \* \* \*